United States Patent
Ramkumar et al.

(10) Patent No.: US 12,366,981 B1
(45) Date of Patent: Jul. 22, 2025

(54) MANAGED DISCOVERY OF INVENTORY INFORMATION FOR USER ACCOUNTS

(71) Applicant: Amazon Technologies, Inc., Seattle, WA (US)

(72) Inventors: Srinivasan Ramkumar, San Jose, CA (US); Rajesh Yarlagadda, San Jose, CA (US); Rajesh Gopidi, Alpharetta, GA (US); Xiangyin Li, San Jose, CA (US); Ramapulla Reddy Chennuru, Milpitas, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 21 days.

(21) Appl. No.: 18/478,253

(22) Filed: Sep. 29, 2023

(51) Int. Cl.
*G06F 3/06* (2006.01)
*G06F 16/2455* (2019.01)
*G06F 9/54* (2006.01)

(52) U.S. Cl.
CPC .......... *G06F 3/0637* (2013.01); *G06F 3/0622* (2013.01); *G06F 3/067* (2013.01); *G06F 16/2455* (2019.01); *G06F 9/541* (2013.01)

(58) Field of Classification Search
CPC .. G06F 3/0637; G06F 16/2455; G06F 3/0622; G06F 3/067; G06F 9/541
USPC ........................................................ 707/705
See application file for complete search history.

(56) References Cited

U.S. PATENT DOCUMENTS

| | | | | |
|---|---|---|---|---|
| 9,323,517 | B2 * | 4/2016 | West ......................... | G06F 8/65 |
| 9,723,025 | B2 * | 8/2017 | Kasturirangan ........ | H04L 63/10 |
| 10,715,458 | B1 * | 7/2020 | Cahill ................. | H04L 63/0815 |
| 10,880,159 | B1 * | 12/2020 | Khoo ................... | H04L 41/0803 |
| 11,165,800 | B2 * | 11/2021 | Thampy .................. | H04L 63/20 |
| 11,340,837 | B1 * | 5/2022 | Vohra .................... | G06F 3/0605 |
| 11,368,481 | B2 * | 6/2022 | Kirti .................... | H04L 63/1416 |
| 11,509,681 | B2 * | 11/2022 | Parekh ................ | H04L 63/1433 |
| 11,709,809 | B1 * | 7/2023 | Li ......................... | G06F 16/219 707/695 |
| 11,886,422 | B1 * | 1/2024 | Li ....................... | G06F 16/2379 |
| 11,983,094 | B2 * | 5/2024 | Downie ............. | G06F 11/3698 |
| 2011/0125894 | A1 * | 5/2011 | Anderson ........... | H04L 63/0807 718/1 |

(Continued)

*Primary Examiner* — Hanh B Thai

(74) *Attorney, Agent, or Firm* — Perilla Knox & Hildebrandt LLP; Jonathan A. Paulis

(57) ABSTRACT

Techniques for managed services of cloud systems to perform inventory discovery of computing instances with particular configurations across user accounts in an organization, and across regions in the cloud systems. Cloud systems offer managed services that automate the management of configurations of computing instances on behalf organizations. To perform cross-account discovery of inventory information for these computing instances, the managed services often harness other internal cloud services, such as internal data-integration services and query services. However, some of these internal cloud services are not available in all the geographic regions of the cloud system, and due to these dependencies, the managed services are in turn not available in all regions. Techniques and architectures are described herein for managed services to perform the cross-account inventory discovery such that these managed services can be made available across all regions, and for launches of new regions in the cloud system.

20 Claims, 17 Drawing Sheets

(56) References Cited

U.S. PATENT DOCUMENTS

| | | | |
|---|---|---|---|
| 2014/0101467 A1* | 4/2014 | Jubran | H04L 41/0856 709/224 |
| 2015/0156065 A1* | 6/2015 | Grandhe | G06Q 10/0631 709/224 |
| 2015/0200953 A1* | 7/2015 | Vidhun | H04L 63/108 726/1 |
| 2016/0132214 A1* | 5/2016 | Koushik | G06F 8/61 715/741 |
| 2017/0339013 A1* | 11/2017 | Allen | H04L 41/145 |
| 2017/0373940 A1* | 12/2017 | Shahab | H04L 47/70 |
| 2018/0205604 A1* | 7/2018 | Allen | H04L 41/145 |
| 2018/0268015 A1* | 9/2018 | Sugaberry | G06F 16/24575 |
| 2020/0153855 A1* | 5/2020 | Kirti | H04L 63/20 |
| 2020/0159421 A1* | 5/2020 | Karumbunathan | G06F 9/45558 |
| 2020/0250009 A1* | 8/2020 | Jaeger | G06F 9/5077 |
| 2020/0351285 A1* | 11/2020 | Eisenkot | G06F 21/316 |
| 2021/0019070 A1* | 1/2021 | Karr | G06F 3/0688 |
| 2021/0191629 A1* | 6/2021 | Vibhor | G06F 3/0659 |
| 2022/0019385 A1* | 1/2022 | Karr | G06F 11/1092 |
| 2022/0210141 A1* | 6/2022 | Parekh | H04L 63/08 |
| 2022/0350794 A1* | 11/2022 | Chintala | H04L 63/0281 |
| 2022/0414094 A1* | 12/2022 | Chintala | H04L 63/0846 |
| 2023/0169090 A1* | 6/2023 | Gernhardt | G06F 16/137 707/610 |
| 2023/0177481 A1* | 6/2023 | Motlagh | H04L 63/102 705/51 |
| 2023/0325519 A1* | 10/2023 | Sterkin | G06F 21/602 726/26 |
| 2023/0336592 A1* | 10/2023 | Narayanaswamy | H04L 63/0263 |
| 2024/0193146 A1* | 6/2024 | Bentley | G06F 16/2379 |
| 2024/0211957 A1* | 6/2024 | Robinson | G06Q 10/10 |
| 2024/0211958 A1* | 6/2024 | Robinson | G06F 21/6209 |
| 2024/0211959 A1* | 6/2024 | Sheikh | G06F 21/629 |
| 2024/0330120 A1* | 10/2024 | Mitkar | G06F 11/2048 |
| 2024/0333704 A1* | 10/2024 | Atur | H04L 63/0807 |

\* cited by examiner

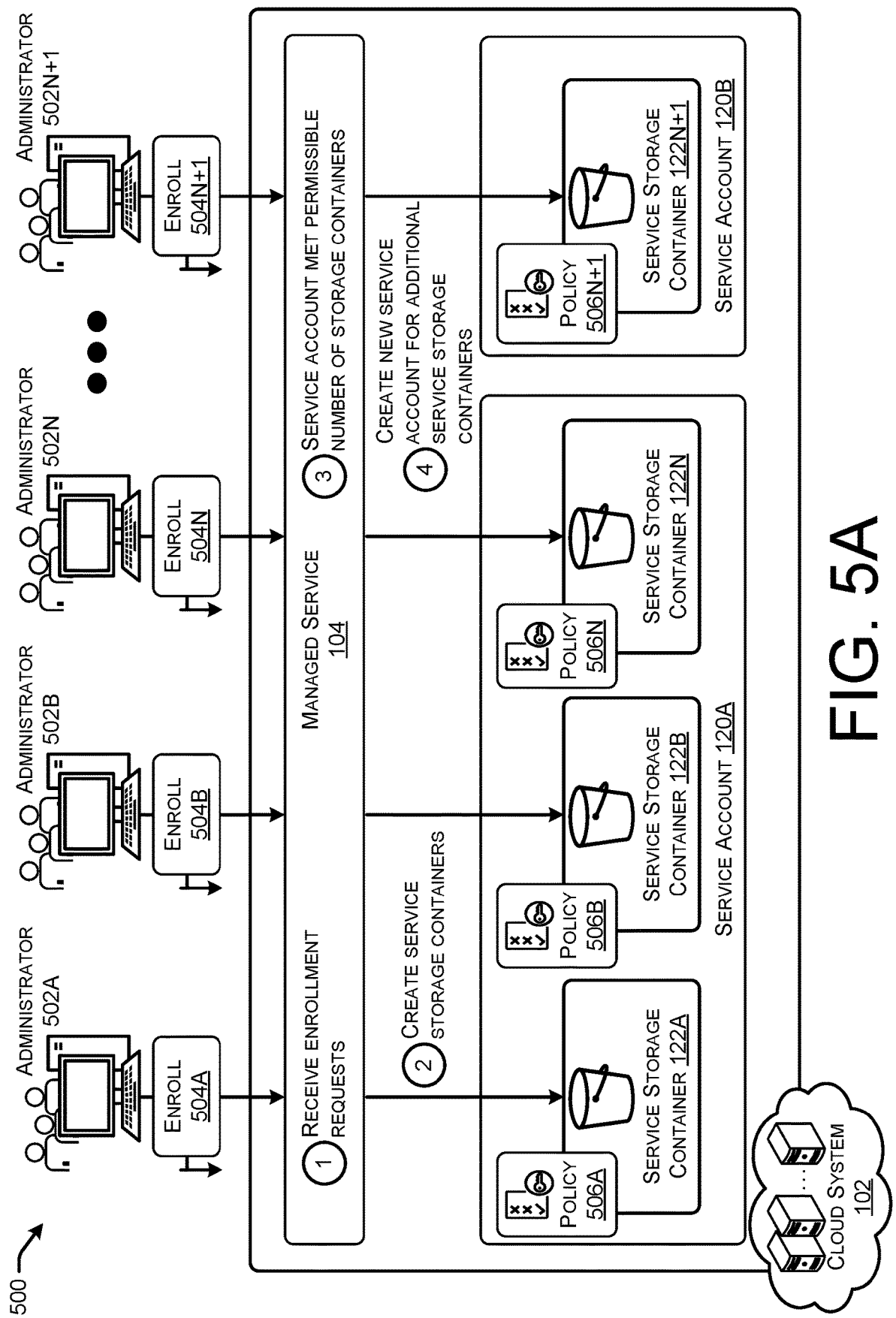

900 ↘

```
┌─────────────────────────────────────────────────────────────────────┐
│  DETERMINE TO OBTAIN FIRST INVENTORY DATA INDICATING FIRST COMPUTING │
│  INSTANCES RUNNING ON BEHALF OF AN ORGANIZATION REGISTERED WITH A    │
│  CLOUD SYSTEM, THE FIRST COMPUTING INSTANCES BEING CONFIGURED BY THE │
│  MANAGED SERVICE AND RUNNING IN A FIRST GEOGRAPHIC REGION            │
│                               902                                    │
└─────────────────────────────────────────────────────────────────────┘
                                  │
                                  ▼
┌─────────────────────────────────────────────────────────────────────┐
│  CREATE A FIRST SERVICE STORAGE CONTAINER IN A FIRST SERVICE ACCOUNT │
│  REGISTERED TO THE MANAGED SERVICE, THE FIRST SERVICE ACCOUNT BEING  │
│  IN THE FIRST GEOGRAPHIC REGION                                      │
│                               904                                    │
└─────────────────────────────────────────────────────────────────────┘
                                  │
                                  ▼
┌─────────────────────────────────────────────────────────────────────┐
│  CONFIGURE FIRST USER ACCOUNTS ASSOCIATED WITH THE ORGANIZATION TO   │
│  SEND RESPECTIVE FIRST PORTIONS OF THE FIRST INVENTORY DATA TO THE   │
│  FIRST SERVICE STORAGE CONTAINER, THE FIRST USER ACCOUNTS RUNNING    │
│  THE FIRST COMPUTING INSTANCES                                       │
│                               906                                    │
└─────────────────────────────────────────────────────────────────────┘
                                  │
                                  ▼
┌─────────────────────────────────────────────────────────────────────┐
│  DETERMINE, BY THE MANAGED SERVICE, TO OBTAIN SECOND INVENTORY DATA  │
│  INDICATING SECOND COMPUTING INSTANCES RUNNING ON BEHALF OF THE      │
│  ORGANIZATION, THE SECOND COMPUTING INSTANCES BEING CONFIGURED BY    │
│  THE MANAGED SERVICE AND RUNNING IN A SECOND GEOGRAPHIC REGION       │
│                               908                                    │
└─────────────────────────────────────────────────────────────────────┘
                                  │
                                  ▼
┌─────────────────────────────────────────────────────────────────────┐
│  CREATE A SECOND SERVICE STORAGE CONTAINER IN A SECOND SERVICE       │
│  ACCOUNT REGISTERED TO THE MANAGED SERVICE, THE SECOND SERVICE       │
│  ACCOUNT BEING IN THE SECOND GEOGRAPHIC REGION                       │
│                               910                                    │
└─────────────────────────────────────────────────────────────────────┘
                                  │
                                  ▼
                               ( 9B )
```

FIG. 9A

MANAGED DISCOVERY OF INVENTORY INFORMATION FOR USER ACCOUNTS

BACKGROUND

Cloud providers offer cloud-based services to fulfill users' computing-service needs without the users having to invest in and maintain computing infrastructure required to implement their services. These cloud providers maintain networks or systems of managed computing resources and functionality to implement various types of scalable, on-demand services, to support applications of the users. In some examples, a cloud provider network (also referred to herein as a "cloud system") can be formed as a number of regions, where a region is a separate geographical area in which the cloud provider clusters data centers. These clusters (or "systems") of data centers may include a number of interconnected computing devices (such as "servers"), that provide computing resources to support applications of the users. Users, which are generally organizations, may be provided with logically isolated portions of the cloud provider network, often referred to as virtual networks or virtual private clouds (VPCs), in which they can launch resources to support their applications. These organizations can have many user accounts registered with the cloud provider, and each of these user accounts may be able to provision and configure computing instances across the different regions of the cloud system. The cloud providers may additionally offer various cloud-based services, or "managed services," that take responsibility for the configuration, operation, and management of the computing instances on behalf of the user accounts. Even with the use of these managed services, it can be difficult to manage computing instances across user accounts of an organization, and across regions of a cloud provider network.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 5A illustrates an example environment in which a managed service determines that a service account has met a permissible number of storage containers, and creates a new service account in which to create additional storage containers.

FIGS. 9A and 9B collectively illustrate a flow diagram of an example method for a managed service to collect inventory data for computing instances of an organization across different geographic regions.

DETAILED DESCRIPTION

Figure 1:
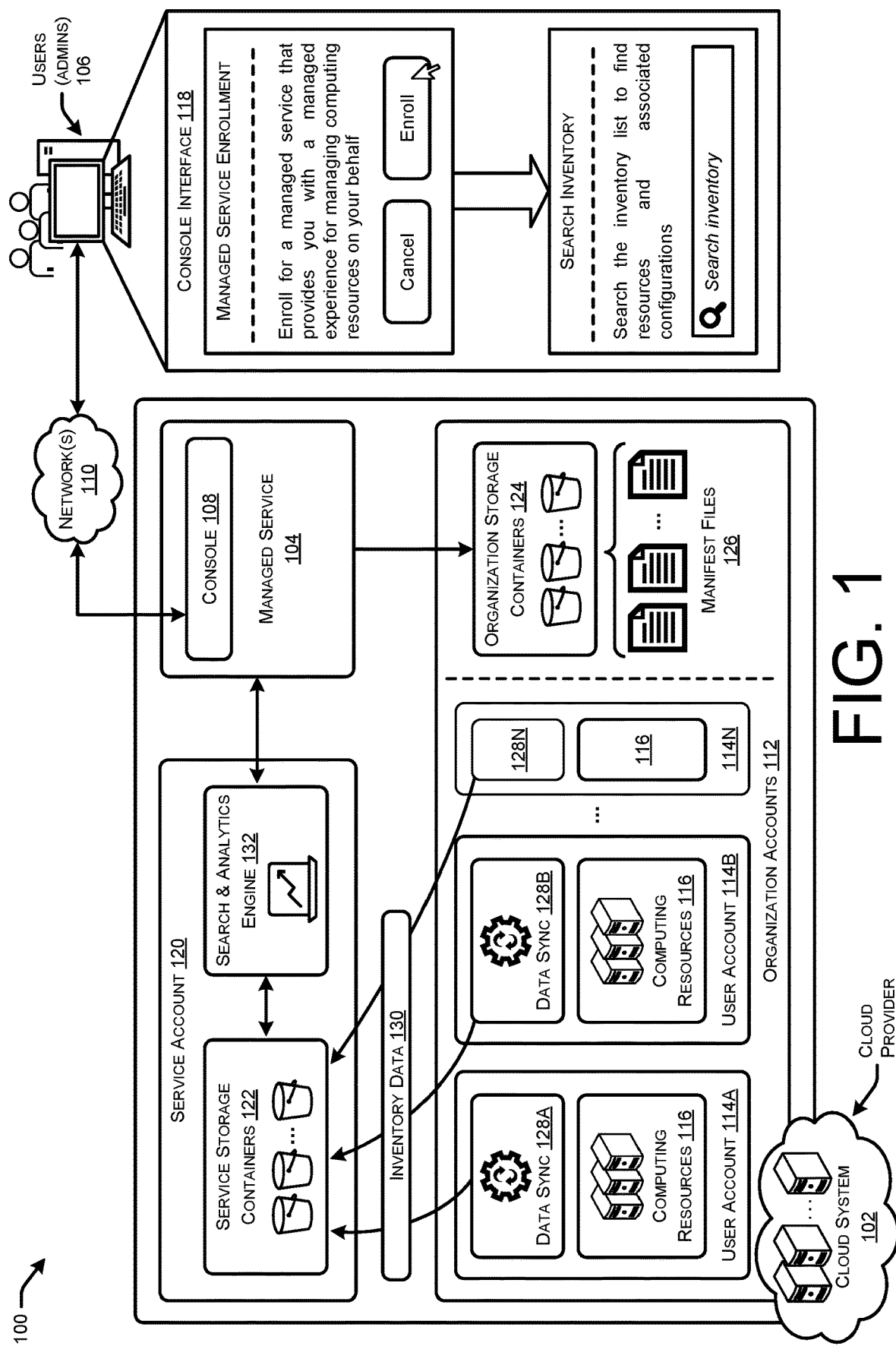
FIG. 1 illustrates a system-architecture diagram of an example environment in which a cloud system has a managed service that performs inventory discovery of computing instances across user accounts of organizations.

This disclosure describes techniques for managed services of cloud systems to perform inventory discovery of computing instances with particular configurations across user accounts in an organization, and across regions in the cloud systems. Cloud systems offer managed services that automate the management of configurations of computing instances on behalf organizations, such as a license manager service that activates and manages software license usage across computing instances of an organization. To perform cross-account discovery of inventory information for these computing instances, the managed services often harness other internal cloud services, such as internal data-integration services and query services. However, some of these internal cloud services are not available in all the geographic regions of the cloud system, and due to these dependencies, the managed services are in turn not available in all regions. This disclosure describes techniques and architectures for managed services to perform the cross-account inventory discovery, and migrate away from dependencies on other cloud services that are unavailable across regions. Using this invention, these managed services can be made available across all regions, and for launches of new regions in the cloud system.

Organizations may opt in or enroll for managed experiences provided by different managed services of the cloud system. The managed services may provide different types of automated, or semi-automated, services for users, such as managed security services, managed incident management services, managed availability services, managed resiliency services, managed compliance services, license manager services, and so forth. Traditionally, managed services have been unable to perform certain types of management operations, such as discovering inventory data for computing instances across different user accounts, and across different regions of the cloud system. For instance, some managed services may rely or depend on other internal cloud services to perform certain operations (e.g., data-integration services, query services, etc.). However, those internal services may not be available in all the geographic regions of the cloud system, and due to these dependencies, the managed services are in turn not available in all regions. Rather, the manages services have been limited to operating in one, or just a few, regions of the cloud system.

Cloud systems provide hierarchies of accounts for use by their customers. As an example, organizations or other customers can create organization accounts. Within those organization accounts, management accounts can be created and used by administrators to perform administrative tasks, and user accounts can be created and used by employees or other users to run or perform various tasks for the organization within the employees' job duties. Managed services generally run as service instances in service accounts that are maintained by cloud providers. However, the service instances running in service accounts traditionally have been unable to "reach" into, or have access to, data across user accounts and across regions due to various constraints. That is, various cross-account or cross-region management operations have been disallowed or were not previously possible.

According to the techniques described herein, when management accounts of organizations opt in for a more managed experience from a managed service, the managed services may request permission from the administrator or manager to perform a cross-account operations in user accounts of the organization account. The managed service may request that the user allow for a set of permissions be created for the managed service (also referred to herein as a "service-linked role"). The management account (or "administrator") may grant the request, and the managed service may create the set of permissions, or the service-linked role, in the organization account that the managed service may assume when performing management operations across the user accounts.

Once the set of permissions are created in the enrolled organization account, the managed service may begin performing various management operations in order to provide cross-account inventory discovery and cross-region inventory discovery on behalf of the organization. The managed service may initially create a service storage container in the service account for the organization that is dedicated to storing inventory data for only that organization. The managed service may attach a policy to the service storage container that only allows for inventory data from that particular organization to be placed in the container, and only allows certain accounts (e.g., management accounts, administrator accounts, etc.) for the organization to request inventory data from the service storage container. Thus, each enrolled organization may have its own private, dedicated service storage container to store their respective inventory data.

Further, the managed service may configure each user account in the organization account to synchronize all inventory data for the computing resources in that user account with the service storage container for the organization. As an example, the managed service may utilize the set of permissions in the organization account to configure a resource data sync in each user account that automatically ports or sends inventory data from the managed computing instances in the user account to the centralized, service storage container. In this way, the managed service has up-to-date inventory data that indicates what computing instances are running in each user account, and which of those computing instances are configured or managed by the managed service.

In some instances, the organization account may have an organization storage container that had previously been used to collect and store the inventory data received from each user account. In such examples, application programming interfaces (APIs) used by the management account or administrators may be programmed or configured to retrieve data and metrics from the organization storage container. Accordingly, rather than reprogramming and changing an API architecture, the techniques described herein may include placing a manifest file in the organization storage container that indicates that the inventory data is now stored in the service storage container, and may point the APIs to the service storage container. The APIs may then be redirected to the service storage container to obtain the desired or requested inventory data.

In some examples, user accounts registered with the cloud system may only be allowed or permitted to store a predefined number of storage containers (e.g., 250, 1,000, etc.). However, the number of organizations that enroll for use of the managed service, and thus the corresponding number of service storage containers, may exceed that permitted number. Accordingly, the managed service may implement sharding logic, or partitioning, where the managed service creates extra service accounts for additional service storage containers when a particular service account has met or is near the permitted number of service storage containers. In this way, the managed service may be able to provide a private, isolated service container for each organization and not have issues with the maximum number of storage containers.

However, as the number of service accounts and storage containers scales, the managed service needs to be able to direct API requests (or other requests) to the appropriate service account and service storage container. Accordingly, the managed service may further place an indication of the service storage container that is reserved for an organization in the manifest files located in each organization account. The service storage containers may be assigned unique identifiers (ID) or names that are globally unique across service accounts. Thus, when an API request hits the organization account, the API may read the globally unique ID of the service storage container in which the inventory for the particular organization is stored. The API request may then be redirected to that unique ID of the service storage container. The managed service may include a routing layer (e.g., routers, gateways, etc.) that receive API requests, identify the globally unique IDs for the service storage containers, and forward the API requests to the service account in which the appropriate service storage containers are included. Further, as noted above, the service storage containers may have attached policies that indicate permissions regarding who is allowed to obtain inventory data from the service storage containers (e.g., management accounts from the particular organization), and restrict other accounts from having access to the service storage containers.

The techniques described herein solve problems rooted in cloud computing technology using solutions rooted in technology. Further, the techniques described herein improve the functioning of cloud systems. As an example, the process of managing inventory data for computing instances across user accounts and/or regions may be difficult or impossible depending on the architecture and processes in place in the cloud system. The techniques described herein enable the collection of inventory data by a managed service across user accounts of an organization, and across regions of the cloud system, thereby improving the functioning of the cloud system. Further, various cross-account management operations have traditionally been disallowed or were not previously possible. The techniques described herein enable additional cross-account management operations, which allows for cloud systems to offer managed services that can provide additional managed experiences for users.

While some of the techniques described herein are with reference to cloud systems, the techniques are equally applicable for on-premises networks and/or hybrid cloud architectures including cloud systems and on-premises or enterprise networks.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a cloud system 102 has a managed service 104 that performs inventory discovery of computing instances across user accounts of organizations.

The cloud system 102 may be operated and/or managed by a cloud or service provider and may provide various services to users to fulfil their computing resource needs, such as cloud-based computing resources. For instance, users 106 may operate user devices in order to register for use of the computing resources of the cloud system 102. The cloud system 102 may include a one or more managed services 104 that include components to provide different types of automated, or semi-automated, services for users, such as managed security services, managed incident management services, managed availability services, managed resiliency services, managed compliance services, license manager services, and so forth. Generally, the managed services 104 may be, at least partly, control-plane systems that control operations occurring in the cloud system 102. The managed services 104 may be either centralized, or distributed, and be supported by one or more computing devices.

As illustrated, a cloud system 102 may be operated and/or managed by a cloud provider. The cloud system 102 may provide various services to users to fulfil their computing resource needs, such as cloud-based computing resources. For example, the cloud system 102 may provide cloud-based, scalable, and network accessible compute power services, storage services, database services, and/or other services. Users 106 may utilize user devices to subscribe for use of the computing resources and/or services provided by the cloud system 102.

A cloud system 102, often referred to as a cloud provider network or simply as a "cloud," refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to user commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud system 102 can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Users 106 can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider system 102 may deliver content from points of presence outside of, but networked with, these regions by way of edge locations and regional edge cache servers. This compartmentalization and geographic distribution of computing hardware enables the cloud provider system 102 to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider system 102 may provide on-demand, scalable computing services to users 106 through a network, for example allowing users 106 to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users 106 to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user 106, the hardware associated with the virtual computing devices can be scaled up or down depending upon the resources the user 106 requires. Users 106 can choose to deploy their virtual computing systems to provide network-based services for their own use and/or for use by their users or client.

The cloud provider system 102 may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users 106 of the cloud provider system 102, which may be provisioned in user accounts.

The cloud system 102 may offer many different built-in services to the users 106 to help run their applications and services. For instance, the cloud system 102 may provide users 106 with use of VPCs, which are logically isolated sections of the cloud system 102 that serve as private virtual environments to which only permitted users 106 have access to use. Users 106 may have multiple VPCs, potentially spanning across different regions of the cloud system 102. To help interconnect VPCs and other resources of the user's computing infrastructure, the service provider may also offer many different built-in networking services. The VPCs may be used by the users 106 to create subnetworks, configure personalized route tables, choose IP addresses, monitor connections, screen network traffic, restrict access into the VPCs, and/or for other operations. As shown. The VPCs include or run computing resources, such as servers, virtual machines (VMs), containers, serverless functions, workloads, processes, etc. Generally, the computing resources are used to support or run applications or services of the users 106.

A virtual private cloud (VPC) (also referred to as a virtual network (VNet), virtual private network, or virtual cloud network, in various implementations) is a custom-defined, virtual network within another network, such as a cloud provider network. A VPC can provide the foundational network layer for a cloud service, for example a compute cloud or an edge cloud, or for a customer application or workload that runs on the cloud. A VPC can be defined by at least its address space, internal structure (e.g., the computing resources that comprise the VPC, security groups), and transit paths.

A VPC is a virtual network dedicated to a particular customer account (or set of related customer accounts, such as different customer accounts belonging to the same business organization). A VPC is logically isolated from other virtual networks in the cloud. Customers can launch resources, such as compute instances, into a VPC. When creating a VPC, a customer can specify a range of IPV4 addresses for the VPC in the form of a Classless Inter-Domain Routing (CIDR) block. A VPC can span all of the availability zones in a particular region. After creating a VPC, a customer can add one or more subnets in each availability zone or edge location.

The cloud system 102 may provide hierarchies of accounts for use by the users 106, and the organization may have created an organization account 112 in which user accounts 114A-114N have been created, and management accounts are also created. As described herein, accounts (e.g., user accounts 114, organization accounts 112, etc.) are used to represent a person or application that uses their accounts to interact with their computing resources 116 located in the user accounts 114 and applications running therein. The user accounts 114 may consist of a name and credentials. The user accounts 114 may include one or more VPCs in which computing resources 116, application instances, and other components are run on behalf of users 106. Generally, the computing resources 116 may be any type of computing instances, such as servers, VMs, containers, serverless functions, workloads, processes, etc. Generally, the computing resources are used to support or run applications or services of the users 106.

The managed service 104 may include or be associated with a console 108 through which the users 106 (e.g., managers, administrators, etc.) may interact with the managed service 104 to enroll with the managed service 104. The console 108 may include one or more of a web console, a command line interface (CLI), an application programming interface (API), or any other portal through which users 106 utilize computing devices to interact with the managed service 104. The users 106 may have a console interface 118 presented on their user devices that includes an option for the users 106 to enroll with the managed service 104. In some instances, the user 106 may be an administrator (or "admin") that uses a management account to enroll an organization, and organization account 112, with which the admin is associated for use of the managed service 104.

During enrollment, the managed service 104 may prompt the user 106 for permission to create permissions, such as service-linked roles, in the organization account 112. The user 106 may grant the managed service 104 these permissions during enrollment for use the managed service 104. Thus, when users 106 opt in for a more managed experience from the managed services 104, the managed services 104 may request permission from the user to install the role(s) in the organization account 112. If the user 106 grants the request, the managed service 104 may assume this role or set of permissions when performing management operations in the organization account 112. The roles may be any type of roles or permissions, including an SLR where an SLR may be a type of role that is linked directly to a managed service 104. SLRs are predefined by the managed service 104 and include all the permissions that the managed service 104 requires to call other services or perform actions on behalf of the user 106. The linked service role also defines how you create, modify, and delete a service-linked role. A managed service 104 might automatically create or delete the role. It might allow users 106 to create, modify, or delete the role as part of a wizard or process. The managed service 104 may define the permissions of its service-linked roles, and unless defined otherwise, only that managed service 104 can assume the roles.

Once the set of permissions are created in the organization account 112, the managed service 104 may begin performing various management operations in order to provide cross-account inventory discovery and cross-region inventory discovery on behalf of the organization account 112. The managed service 104 may initially create a service storage container 122 in a service account 120 for the organization account 112 that is dedicated to storing inventory data 130 for only that organization account 112. The managed service 104 may attach a policy to the service storage container 122 that only allows for inventory data 130 from that particular organization to be placed in the service storage container 122, and only allows certain accounts (e.g., management accounts, administrator accounts, etc.) for the organization account 112 to request inventory data 130 from the service storage container 122. Thus, each enrolled organization account 112 may have its own private, dedicated service storage container 122 to store their respective inventory data 130.

Further, the managed service 104 may configure each user account 114 in the organization account 112 to synchronize all inventory data 130 for the computing resources 116 in that user account 114 with the service storage container 122 for the organization. As an example, the managed service 104 may utilize the set of permissions in the organization account 112 to configure a data sync 128A-128N in each user account 114A-114N that automatically ports or sends inventory data 130 from the managed computing instances (computing resources 116) in the user account 114 to the centralized, service storage container 122. In this way, the managed service 104 has up-to-date inventory data 130 that indicates what computing resources 116 (or "computing instances") are running in each user account 114, and which of those computing resources 116 are configured or managed by the managed service 104.

The inventory data 130 may include information about various resources that are managed within a user account 114. This inventory data 130 typically includes details such as resource names, types, configurations, and other relevant attributes. Examples of the inventory data 130 may include compute instance data (e.g., instance IDs, types, states, security groups, tags, etc.), storage containers/resources (e.g., names, regions, permissions, object count, policies, database resources (e.g., names, engines, instance details, endpoints, storage, etc.) serverless function data (e.g., names, runtimes, memory, roles, last modified, etc.) and/or data associated with user accounts, VPCs, load balancers, auto scaling groups, notification services, and so forth. The inventory data 130 may include configuration data, as well as indications of the managed service(s) 104 that manage the configurations.

In some instances, the organization accounts 112 may have organization storage containers 124 that had previously been used to collect and store the inventory data 130 received from each user account 114. In such examples, APIs used by the management account or administrators may be programmed or configured to retrieve data and metrics from the organization storage containers 124. Accordingly, rather than reprogramming and changing an API architecture, the techniques described herein may include placing a manifest file 126 in the organization storage container 124 that indicates that the inventory data 130 is now stored in the service storage container 122, and may point the APIs to the service storage container 122. The APIs may then be redirected to the service storage container 122 to obtain the desired or requested inventory data 130.

The console interface 118 may further provide options for the admins to search and obtain the inventory data 130, and/or analytics determined by a search & analytics engine 132. For instance, the user 106 may search an inventory list to find resources and associated configurations. The managed service 104 may implement or manage configurations of the computing resources 116, such as managing security aspects (e.g., implementing firewall rules or security groups, removing permissions from accounts, etc.), availability operations (e.g., creating fallback resources, adding availability zones, etc.), software license activation and management, and/or other operations. The console interface 118 may be used to query various information or analytics around the configurations of these computing resources 116, and the search & analytics engine 132 may analyze the inventory data 130 and respond to the requests sent from the users 106.

Thus, users 106 may have created user accounts with the cloud provider to utilize the computing resources 116 of the cloud system 102. The users 106 may utilize their devices to communicate over one or more networks 110 (e.g., WANs, PANs, LANs, etc.) with the cloud system 102. The user devices may comprise any type of computing device configured to communicate over network(s) 110, such as mobile phones, tablets, laptop computers, desktop computers, televisions, servers, and/or any other type of computing device. The users 106 (e.g., network administrators, organization employees, etc.) may interact with the cloud system 102, via their user account and/or one or more user portals or consoles 108 (e.g., web console, command line interface (CLI), application programming interface (API), etc.).

Generally, the managed services 104, and components thereof, may comprise software, firmware, and/or other logic that is supported one computing device, or across more computing devices in the cloud system 102. Additionally, the managed services 104 may comprise a system of other devices. The techniques described herein are generally described with respect to a service provider network, such as a cloud provider network or system. However, the techniques are generally applicable for any network, such as on-premises networks, hybrid networks, and so forth.

Figure 2A:
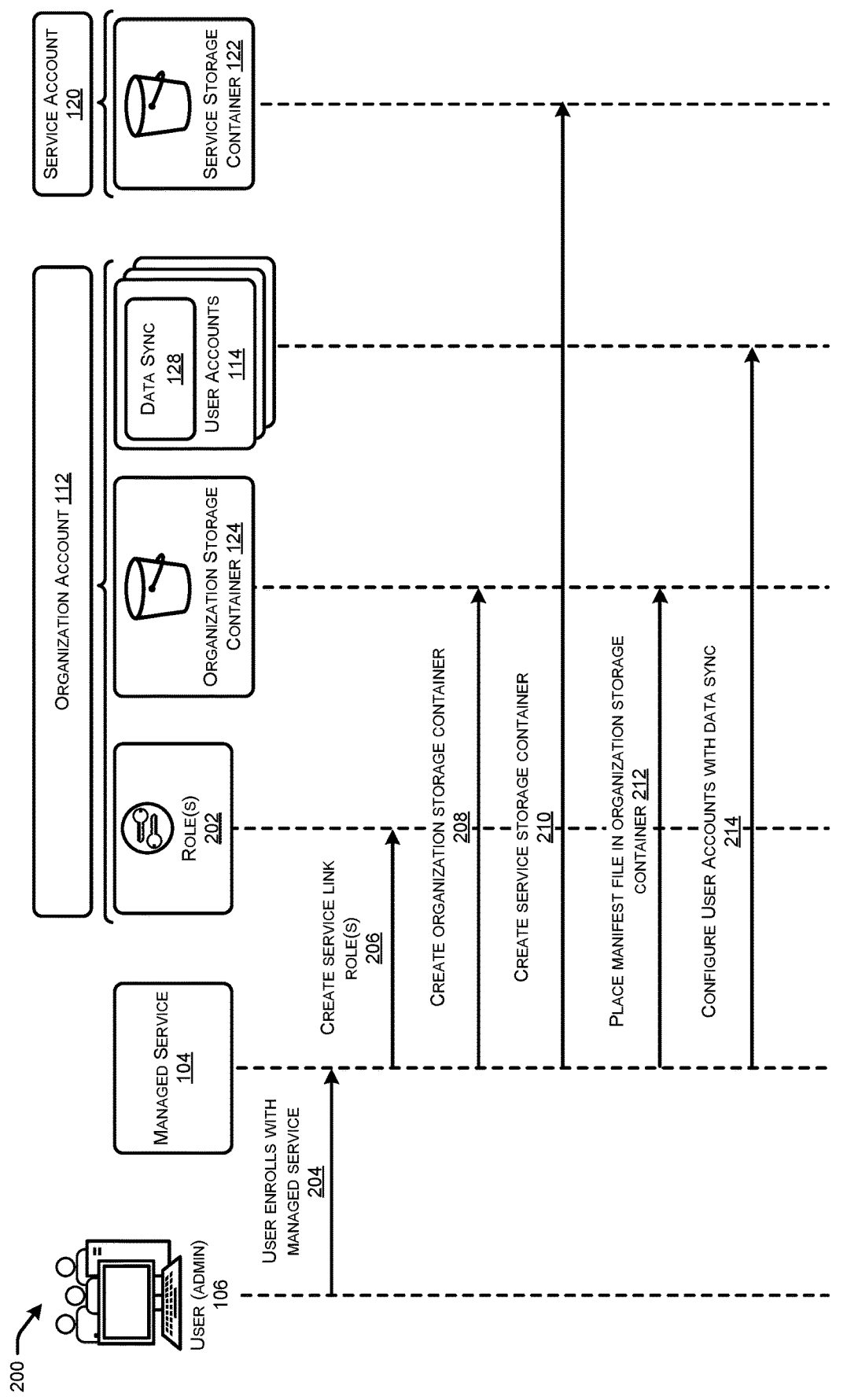
FIGS. 2A and 2B collectively illustrate a sequence diagram of an example process for a managed service to collect inventory data across user accounts of an organization.
Figure 2B:
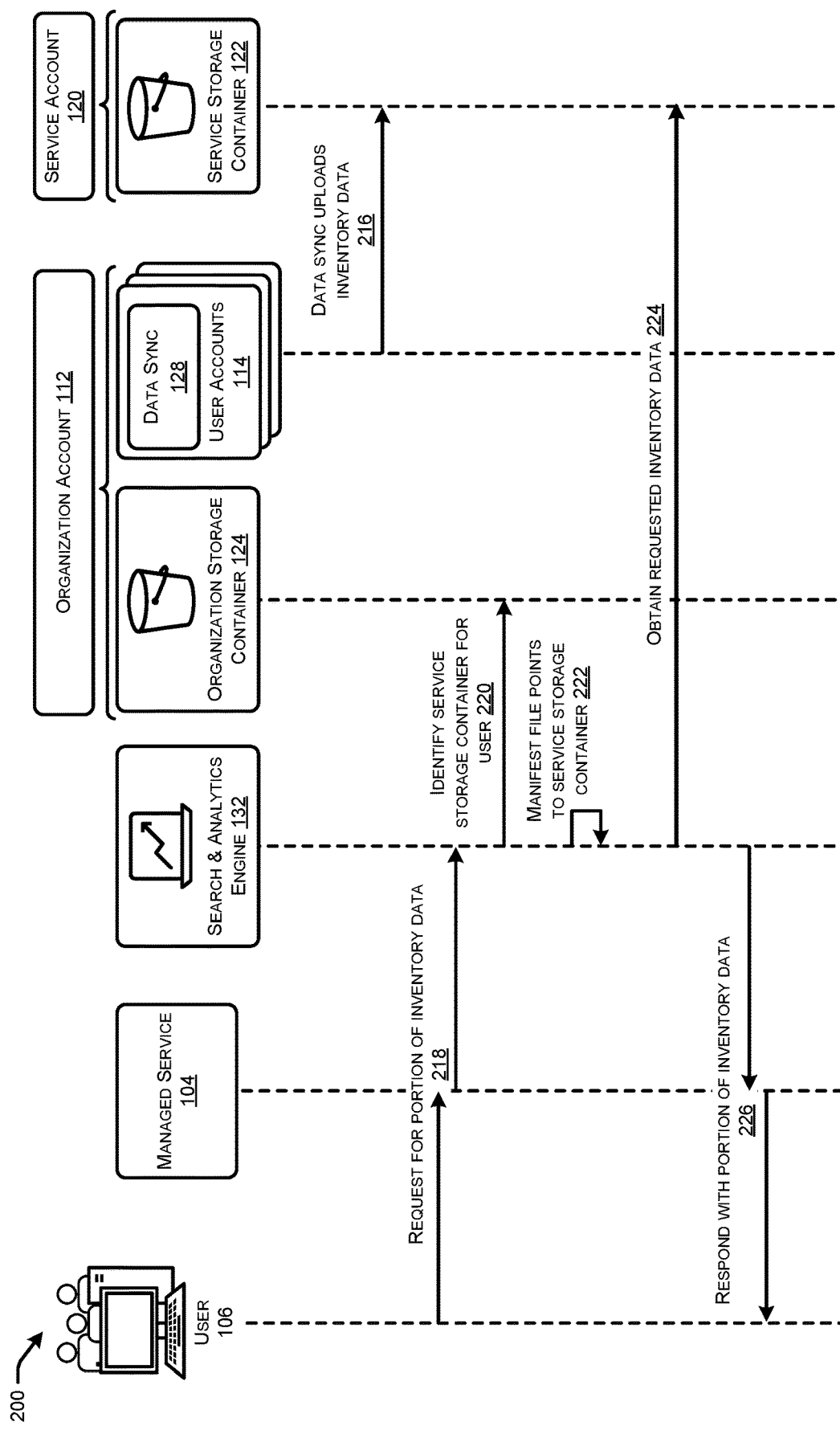

FIGS. 2A and 2B collectively illustrate a sequence diagram of an example process 200 for a managed service 104 to collect inventory data 130 across user accounts 114 of an organization.

At 204, the user 106 may enroll with a managed service 104. As part of the enrollment, the managed service 104 may request permission to create roles 202 in the user account 114. At 206, the managed service 104 may create the roles 202 in the user account 114 for the managed service 104 to assume. For instance, the managed service 104 may create a service-linked role 202 in the organization account 112 by establishing a unique type of IAM (Identity and Access Management) role that is pre-configured and predefined to be used by the managed service 104. This role 202 is designed to be automatically associated with the specific managed service 104 and contain the necessary permissions to perform actions on resources within those services.

At 208, the managed service 104 may create an organization storage container 124 in the organization account 112. The organization storage container 124 may have initially been created to store the inventory data 130 in the organization account 112.

At 210, the managed service 104 may create a service storage container 122 in the service account 120. The service storage container 122 may be configured to store inventory data 130 on behalf of a particular organization, and have attached policies that restrict access to the inventory data 130, and allow management accounts of the organization to access the inventory data 130 in the service storage container 122.

At 212, the managed service 104 may place a manifest file 126 in the organization storage container 124. The manifest file 126 stored in the organization storage container 124 may indicate that the inventory data 130 is now stored in the service storage container 122, and may point the APIs to the service storage container 122.

At 214, the managed service 104 may configure user accounts 114 with a data sync 128 in each user account 114 that automatically ports or sends inventory data 130 from the managed computing instances (computing resources 116) in the user account 114 to the centralized, service storage container 122. At 216, the data syncs 128 may upload the inventory data 130 to the service storage container 122. The data syncs 128 may resync the inventory data 130 upon detecting changes in the computing resources 116. In some instances, the data syncs 128 may periodically, and according to a configurable periodicity, sync the inventory data 130 to the service storage container 122.

At 218, the user 106 may submit a request for a portion of the inventory data 130, and the request (which may be an API request) may be sent from the managed service 104 and to the search & analytics engine 132. The user 106 may be presented with a listing of entity IDs (e.g., resource IDs), and may select a filter for the entity IDs. At 220, the search & analytics engine 132 may look into the organization storage container 124 to determine where the requested inventory data 130 is located. The search & analytics engine 132 may use the manifest file 126 at 222 to determine the service storage container 122 that was created for the inventory data 130 for the organization.

In some examples, API request communicated by the search & analytics engine 132 may attempt to access inventory data 130 from the organization storage container 124. However, the organization storage container 124 may not include the inventory data 130, and instead include the manifest file 126 that indicates that the inventory data 130 is now stored in the service storage container 122. At 222, the manifest file 126 and may point the APIs to the service storage container 122. The APIs may then be redirected to the service storage container 122 to obtain the desired or requested inventory data 130.

At 224, the search & analytics engine 132 may obtain the requested inventory data 224 using the API request from the service storage container 122. At 226, the search & analytics engine 132 may respond with the portion of the inventory data 130 to the user 106 (admin).

Figure 3A:
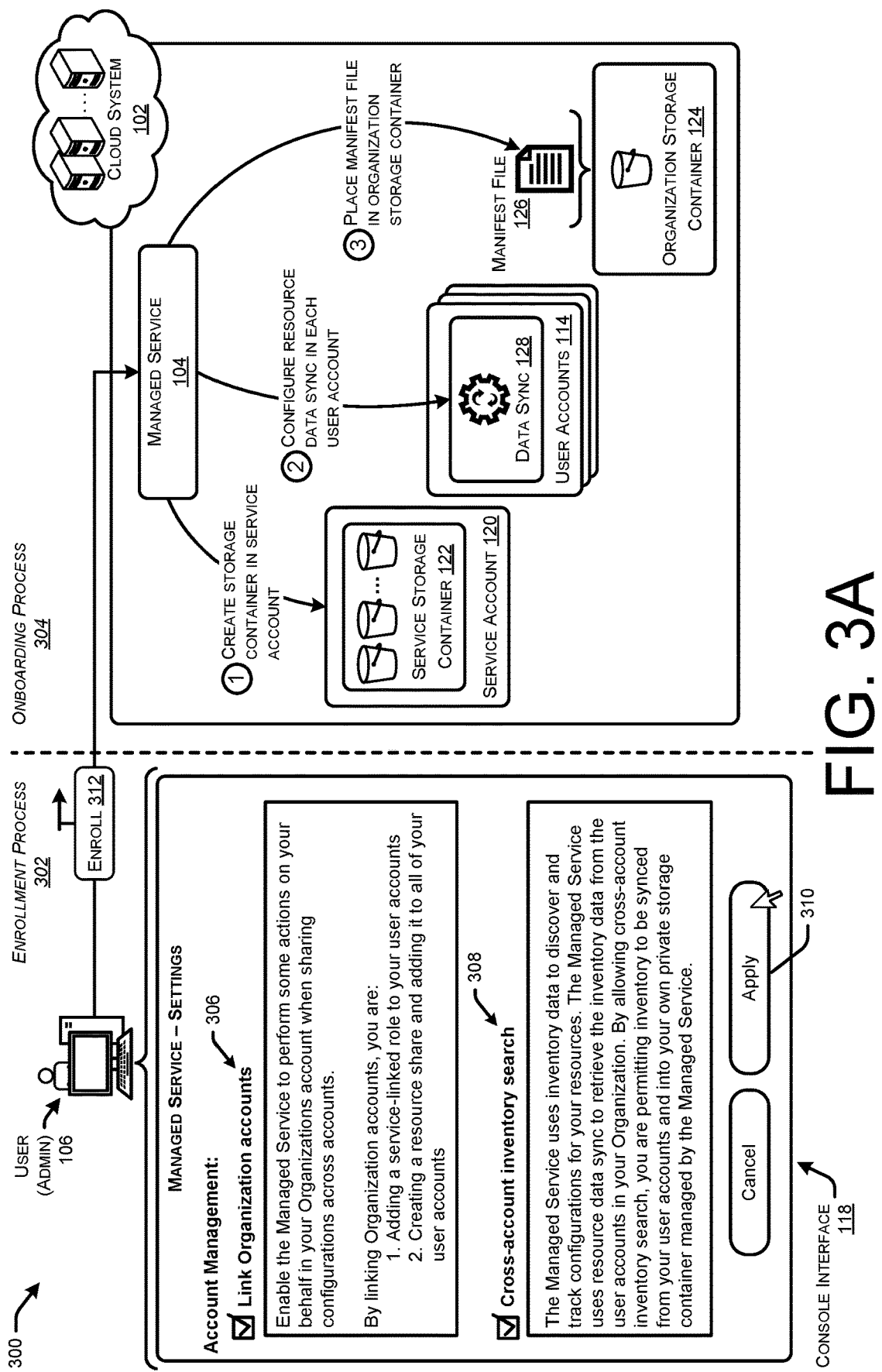
FIG. 3A illustrates an example environment in which an administrator enrolls an organization for use of a managed service, and the managed service onboards the organization.

FIG. 3A illustrates an example environment 300 in which an administrator enrolls an organization for use of a managed service, and the managed service 104 onboards the organization.

The user 106, which may be a manager or admin in this case, may be presented with a user interface as part of the enrollment process 302. The user interface, which may be included in the console interface 118, may include a link organization accounts option 306 through which the admin may allow the managed service 104 to perform some management actions on behalf of the organization account 112. Further, the user interface may include a cross-account inventory search option 308 through which the admin may allow the managed service 104 to sync inventory data from the user accounts 114 and into the service storage container 122 in the service account 120. In examples where the admin selects an apply option 310, the user device may send enroll data 312 to the cloud system 102 indicating the request to enroll in the managed service 104.

The managed service 104 may enter the onboarding process 304 where the managed service 104 onboards the organization. At "1," the managed service 104 may create a service storage container 122 in the service account 120 for the organization. At "2," the managed service 104 may configure a resource data sync 128 in each of the user accounts 114, and at "3," the managed service 104 may place a manifest file 126 in an organization storage container 124.

Figure 3B:
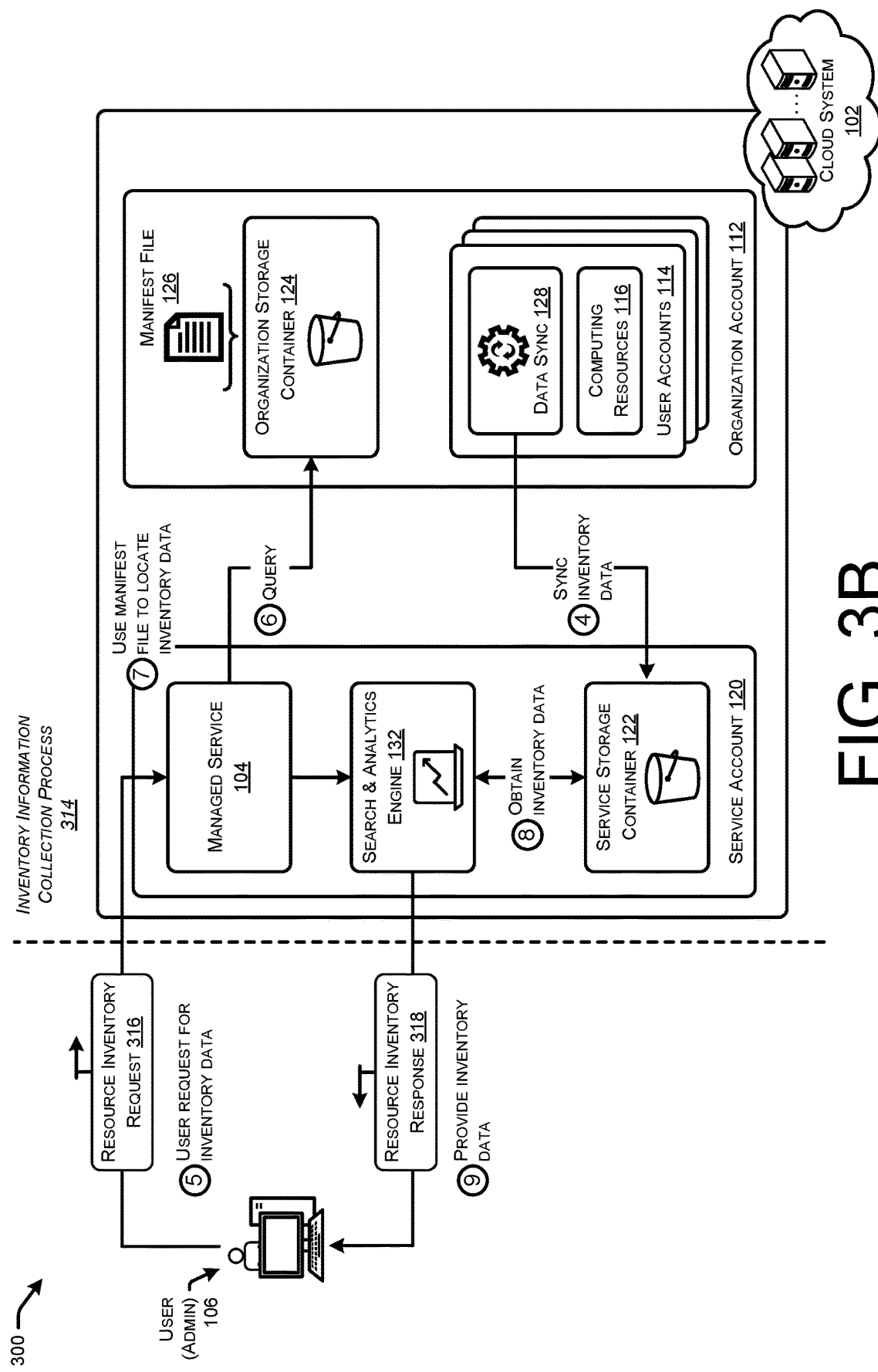
FIG. 3B illustrates an example environment in which an administrator requests that a managed service provide inventory data from a managed service.

FIG. 3B illustrates an example environment 300 in which an administrator requests that a managed service 104 provide inventory data 130 from the managed service 104. At "4," the data sync 128 may sync the inventory data 130 into the service storage container 122 that is designated for the organization account 112. At "5," the user 106, which is an admin in this case, may send a resource inventory request 316 to the managed service 104. Resource inventory request 316 may, at "6," query the organization storage container 124 to determine what service storage container 122 belongs to the organization account 112. The organization storage container 124 may not include the inventory data 130, and at "7," the resource inventory request 316 may use the manifest file 126 to locate the inventory data 130 as being in the service storage container 122. That is, the manifest file 126 may indicate the service storage container 122 that is allocated for the organization. At "8," the resource inventory request 316 may obtain the requested inventory data 130 from the storage container 122, and at "9," the inventory data 130 may be provided to the user 106 in a resource inventory response 318.

Figure 4:
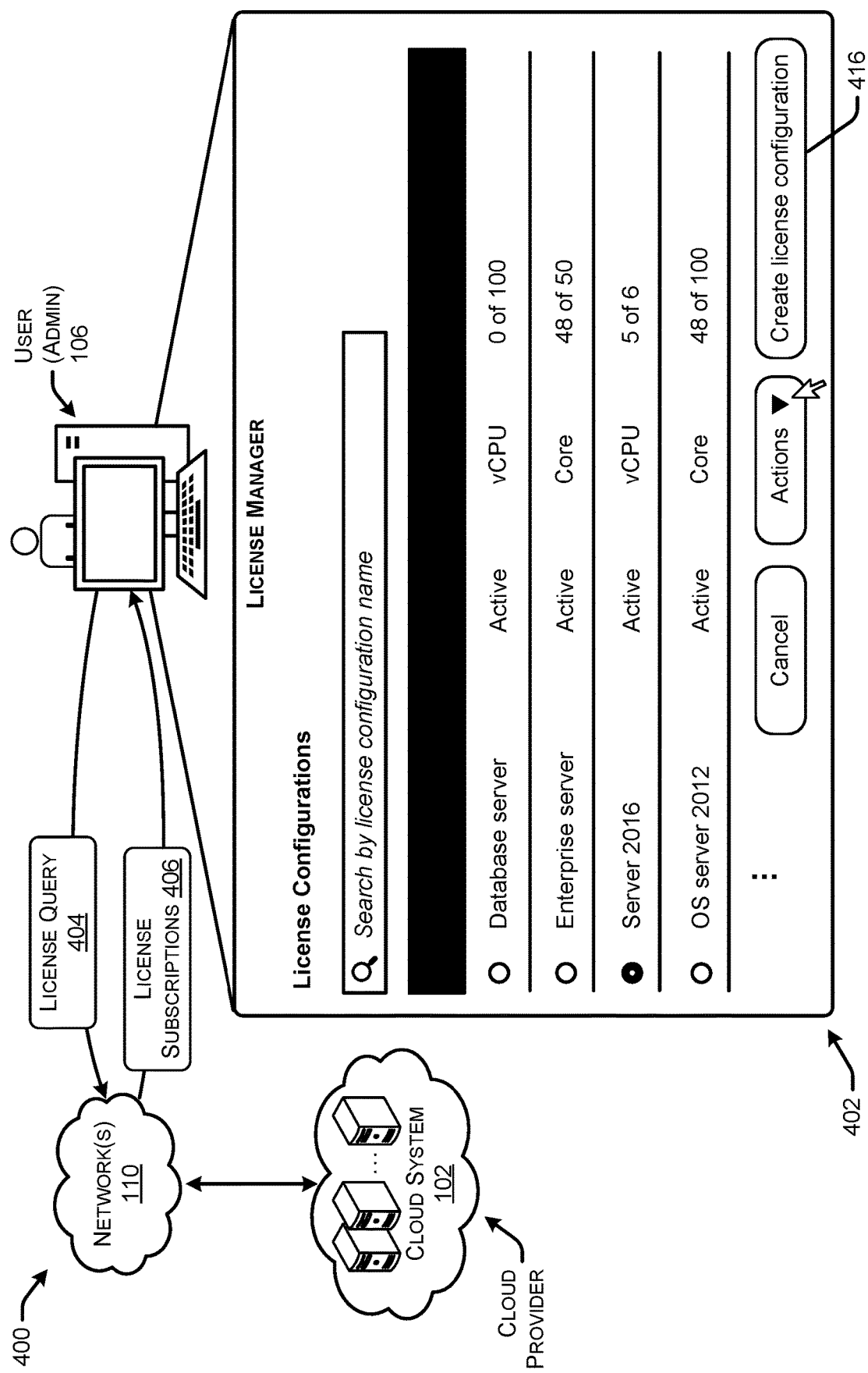
FIG. 4 illustrates an example user interface through which an administrator of an organization views inventory data collected by a managed service, such as license subscriptions managed by a license manager service.

FIG. 4 illustrates an example environment 400 including a user interface 402 through which an administrator of an organization views inventory data 130 collected by a managed service 104, such as license subscriptions managed by a license manager service.

The user 106 may send a license query 404 to the cloud system 102, and the managed service 104 may send license subscriptions 406 to the user 106. In this example, the managed service 104 may be a license manager service that obtains the inventory data 130 from the service storage container 122 and determine what computing resources 116 are running. The managed service 104 may then cross-reference those computing resources 116 with indications as to which of the computing resources 116 were provided, and are using, software licenses. The license subscriptions 406 may indicate usage data for the license subscriptions.

The user interface (UI) 402 includes a license configuration column 408 in which the names or types of licenses are listed, and a status column 410 that indicates a status of the licenses. The UI 402 may further include a type column 412 that indicates a type of the license, and a licenses consumed column 414 that indicates how many of the available licenses are being used in the user accounts 114 across the organization. The user 106 may be able to submit queries, or filters, for the inventory data 130 and receive portions of the inventory data 130 that are responsive to the queries of the users 106 depending on the request.

FIG. 5A illustrates an example environment 500 in which a managed service 104 determines that a service account 120A has met a permissible number of storage containers, and creates a new service account 120B in which to create additional storage containers.

Administrators 502A-502N may each enroll 504A-504N with the managed service 104, and the managed service 104 may receive the enrollment requests at "1." At "2," the managed service 104 may create service storage containers 122A-122N for the organizations represented by the administrators 502A-502N.

In some examples, service accounts 120 registered with the cloud system 102 may only be allowed or permitted to store a predefined number of service storage containers 122 (e.g., 250, 1,000, etc.). However, the number of organizations that enroll for use of the managed service 104, and thus the corresponding number of service storage containers 122, may exceed that permitted number. Accordingly, the managed service 104 may implement sharding logic, or partitioning, where the managed service 104 creates a service account 120B for additional service storage containers 122N+1 when the service account 120A has met or is near the permitted number of service storage containers. In this way, the managed service 104 may be able to provide a private, isolated service container for each organization and not have issues with the maximum number of storage containers. Thus, the administrator 502N+1 that enrolls with the managed service 104. The managed service 104 may create the new service account 120B and create a service storage container 122N+1 in the service account 120B.

Figure 5B:
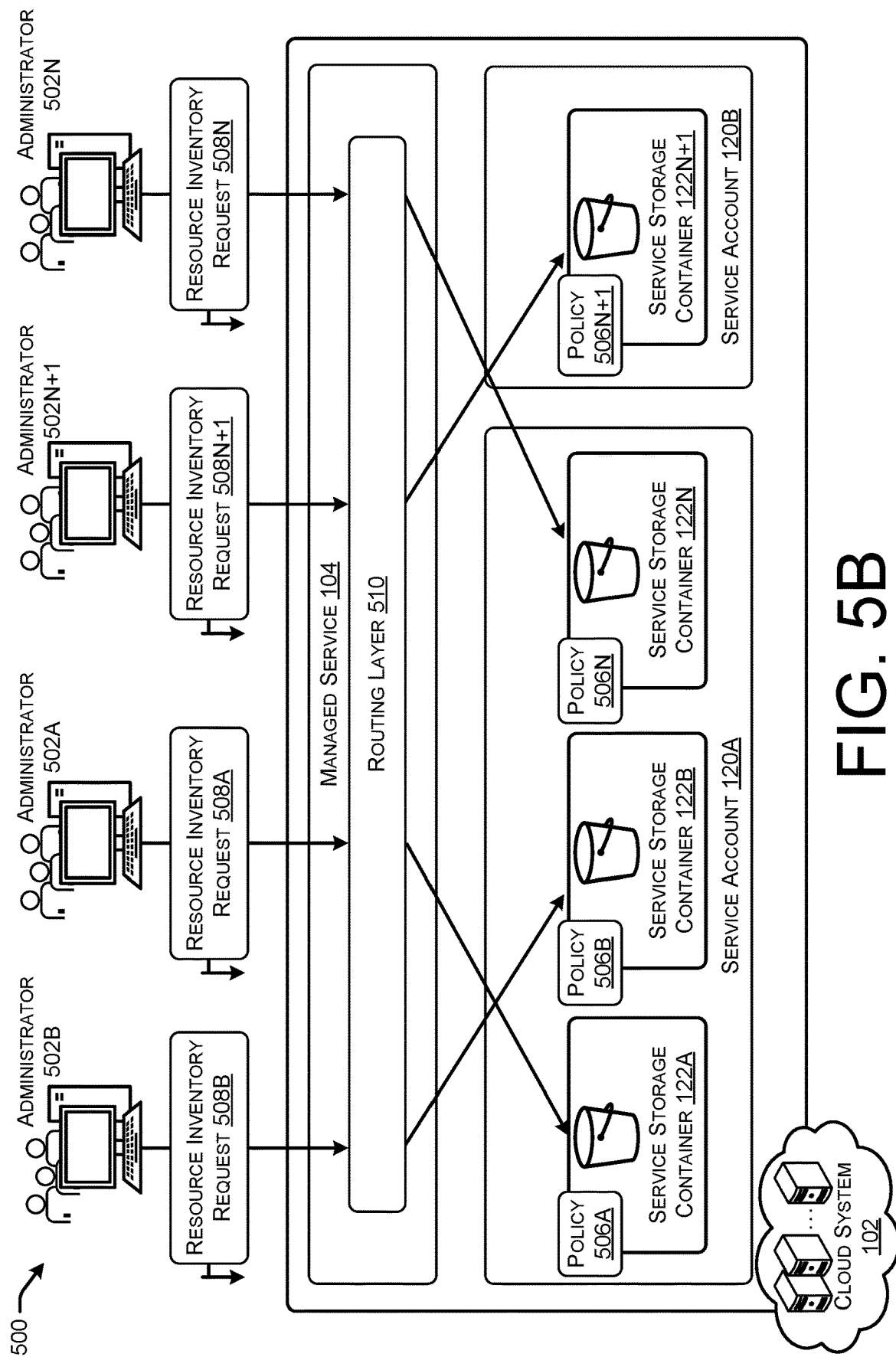
FIG. 5B illustrates an example environment in which a routing layer of a managed service receives resource-inventory requests from administrators of organizations, and routes the requests to the appropriate service account and service storage container.

FIG. 5B illustrates an example environment 500 in which a routing layer 510 of a managed service 104 receives resource-inventory requests 508 from administrators 502 of organizations, and routes the requests to the appropriate service account 120 and service storage container 122.

As the number of service accounts 120 and service storage containers 122 scales, the managed service 104 needs to be able to direct the resource inventory requests 508 (e.g., API requests or other requests) to the appropriate service account 120 and service storage container 122. Accordingly, the managed service 104 may further place an indication of the service storage container 122 that is reserved for an organization in the manifest files 126 located in each organization account 112. The service storage containers 122 may be assigned unique IDs or names that are globally unique across service accounts 120. Thus, when a resource inventory request 508 hits the organization account 112, the resource inventory request 508 may read the globally unique ID of the service storage container 122 in which the inventory for the particular organization is stored. The resource inventory request 508 may then be redirected to that unique ID of the service storage container 122. The managed service 104 may include a routing layer 510 (e.g., routers, gateways, etc.) that receive resource inventory request 508, identify the globally unique IDs for the service storage containers 122, and forward the resource inventory request 508 to the service account 120 in which the appropriate service storage containers 122 are included. Further, as noted above, the service storage containers 122 may have attached policies 506 that indicate permissions regarding who is allowed to obtain inventory data from the service storage containers 122 (e.g., management accounts from the particular organization), and restrict other accounts from having access to the service storage containers 122.

Figure 6:
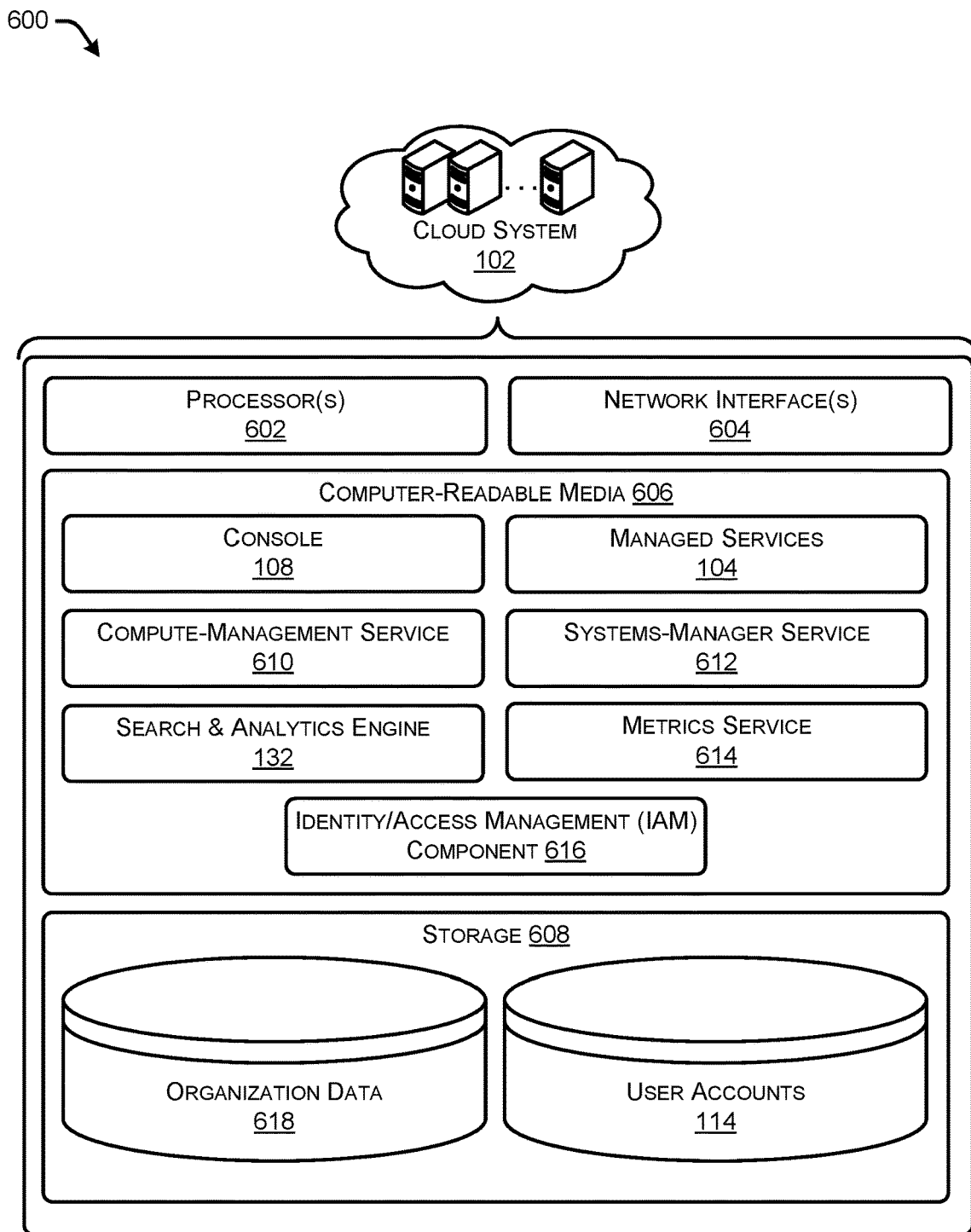
FIG. 6 illustrates a component diagram of example components of a cloud system that performs the techniques described herein.

FIG. 6 illustrates a component diagram 600 of example components of a cloud system 102 that performs the techniques described herein. As illustrated, the cloud system 102 may include one or more hardware processors 602 (processors), one or more devices, configured to execute one or more stored instructions. The processor(s) 602 may comprise one or more cores. Further, the cloud system 102 may include one or more network interfaces 604 configured to provide communications between the cloud system 102 and other devices, such as the user device(s), and/or other systems or devices in the cloud system 102 and/or remote from the cloud system 102. The network interfaces 604 may include devices configured to couple to personal area networks (PANs), wired and wireless local area networks (LANs), wired and wireless wide area networks (WANs), and so forth.

The cloud system 102 may also include computer-readable media 606 that stores various executable components (e.g., software-based components, firmware-based components, etc.). In addition to various components discussed with reference to the previous Figures, the computer-readable-media 606 may further store components to implement functionality described herein. While not illustrated, the computer-readable media 606 may store one or more operating systems utilized to control the operation of the one or more devices that comprise the cloud system 102. According to one embodiment, the operating system comprises the LINUX operating system. According to another embodiment, the operating system(s) comprise the WINDOWS SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the cloud system 102 may include a data store, or storage 608, which may comprise one, or multiple, repositories or other storage locations for persistently storing and managing collections of data such as databases, simple files, binary, and/or any other data. The storage 608 may include one or more storage locations that may be managed by one or more database management systems.

The computer-readable media 606 may store services, or components, of the cloud system 102 as described herein. Further, the computer-readable media 606 may store a compute-management service 610 that is a centralized platform or system designed to oversee and optimize the allocation, deployment, and utilization of computing resources 116 within the cloud system 102. The compute-management service 610 may employ algorithms to schedule tasks, balancing the distribution of resources like CPUs, memory, and storage based on priority, deadlines, and requirements. The compute-management service 610 also offers elasticity, allowing for dynamic adjustments in resource allocation to meet changing workload demands. Additionally, the compute-management service 610 monitors system health, optimizing performance and ensuring fault tolerance through mechanisms that reallocate tasks in the event of hardware or software failures. The compute-management service 610 also assists in controlling costs by providing insights into resource consumption and suggesting cost-saving strategies.

The computer-readable media 606 may store a systems-manager service 612 that streamlines the management of computing resources 116 and applications. The systems-manager service 612 offers a range of tools for tasks like securely storing sensitive data, automating operational processes, and ensuring consistent configurations across instances. The systems-manager service 612 allows users 106 to centrally manage configurations and automate tasks like patching and software installations. The systems-manager service 612 also provides tools for tracking inventory, scheduling maintenance activities, and securely accessing instances.

To utilize the services provided by the cloud system 102, the users 106 may register for accounts 114 with the cloud system 102. For instance, users 106 may utilize a user device to interact with an identity and access management (IAM) component 616 that allows the users 106 to create user accounts 114 with the cloud system 102. Generally, the IAM component 616 may enable the users 106 to manage their network infrastructures remotely. Generally, the different user accounts 114 can assume different roles, or sets or permissions/credentials, that allow network users 106 to perform different actions, and be restricted from performing some actions. In some instances, a same organization may have multiple accounts that have different network infrastructures.

The computer-readable media 606 may be used to store and retrieve information, such as program modules, data structures, or other data. It should be appreciated by those skilled in the art that computer-readable storage media is any available media that provides for the non-transitory storage of data and that can be accessed by the cloud system 102. In some examples, the operations performed by the cloud system 102, and or any components included therein, may be supported by one or more server devices. Stated otherwise, some or all of the operations performed by the cloud system 102, and or any components included therein, may be performed by one or more computer devices operating in a cloud-based arrangement.

By way of example, and not limitation, computer-readable storage media 606 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

FIGS. 7A, 7B, 8, 9A, and 9B illustrate flow diagrams of example methods 700, 800, and 900 that illustrate aspects of the functions performed at least partly by the cloud system 102 as described in this disclosure. The logical operations described herein with respect to FIGS. 8-10 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7A, 7B, 8, 9A, and 9B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 7A:
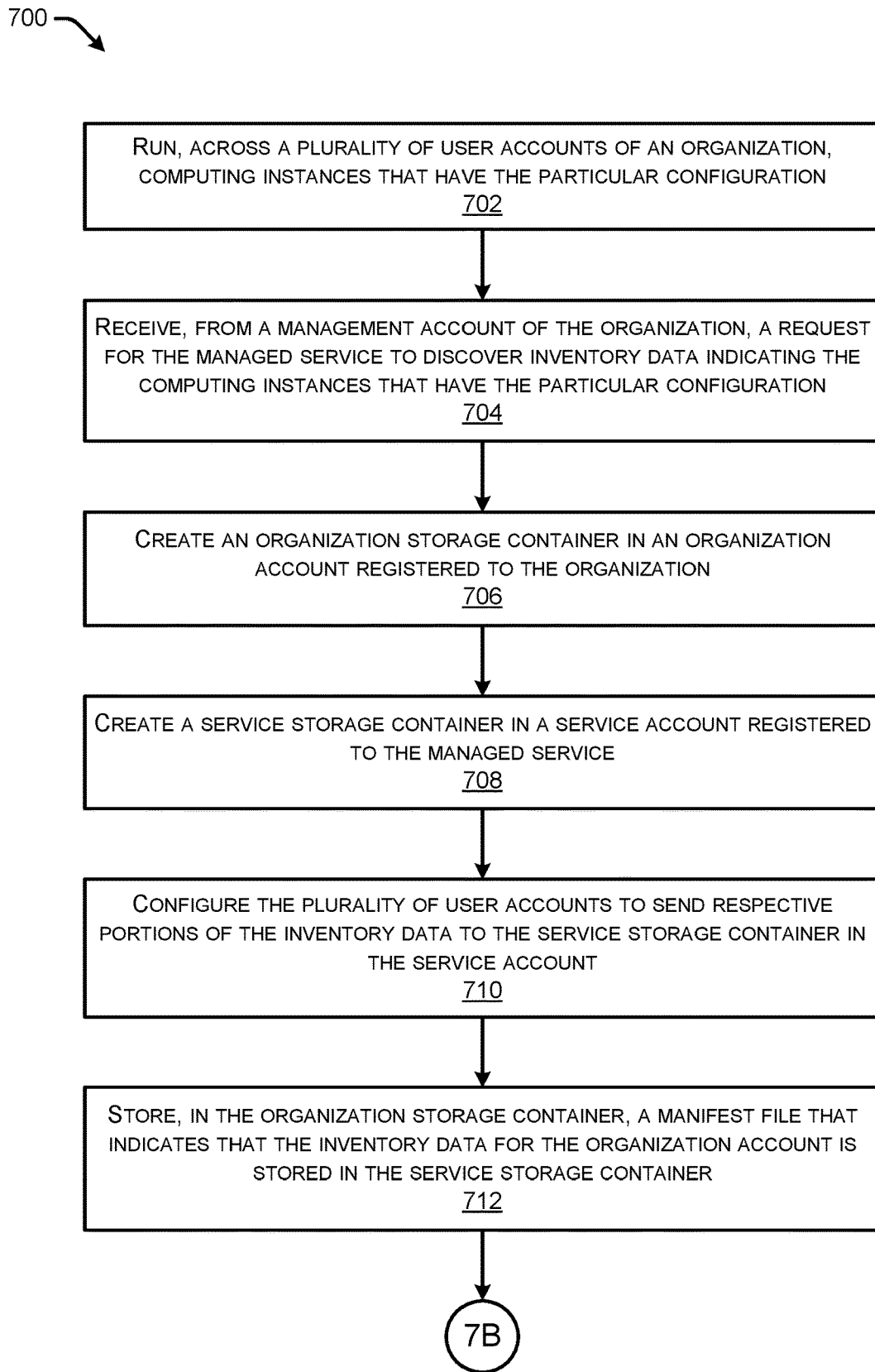
FIGS. 7A and 7B collectively illustrate a flow diagram of an example method for a managed service to receive a request to discover inventory information for computing instances of an organization, configure user accounts with resource data syncs to send inventory data to a service storage container, and place a manifest file in an organization storage container to point requests to the service storage container to retrieve the inventory data.
Figure 7B:
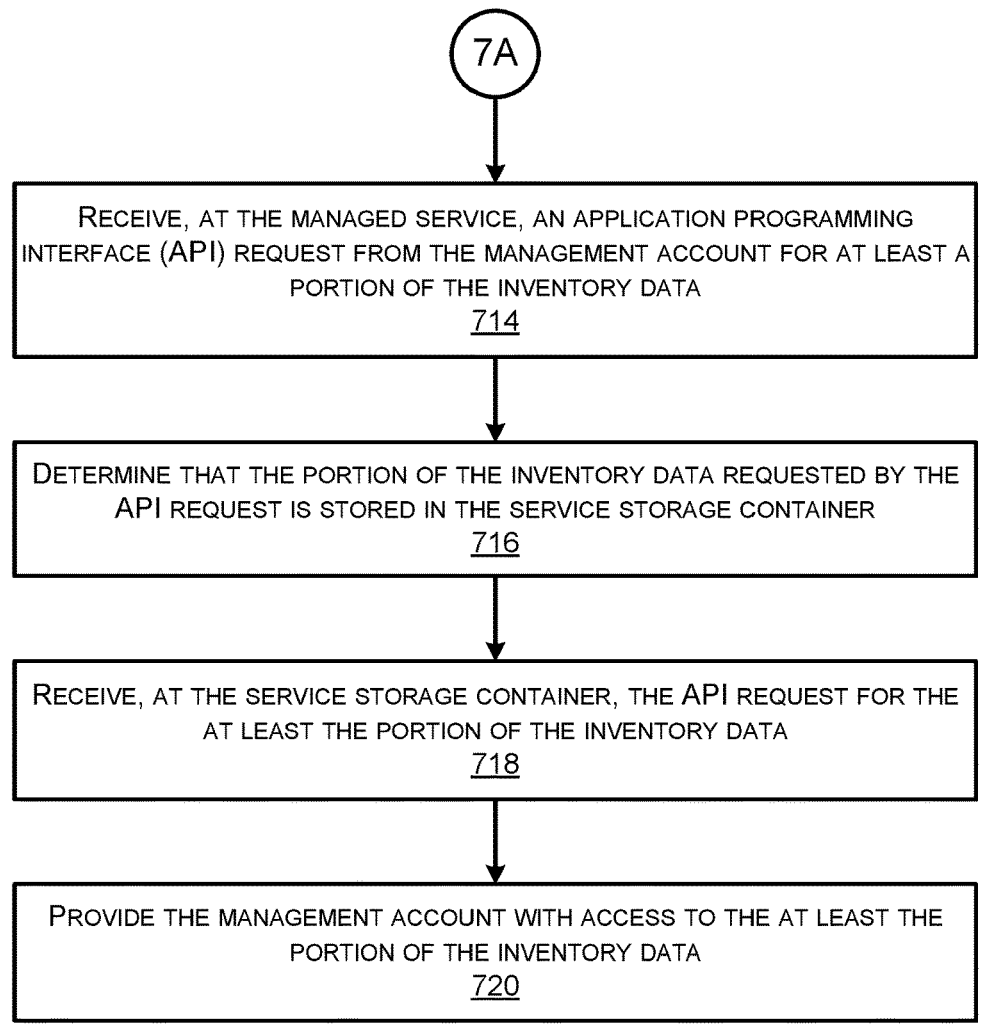

FIGS. 7A and 7B collectively illustrate a flow diagram of an example method 700 for a managed service 104 to receive a request to discover inventory information 130 for computing instances 116 of an organization, configure user accounts 114 with resource data syncs 128 to send inventory data 130 to a service storage container 122, and place a manifest file 126 in an organization storage container 124 to point requests to the service storage container 122 to retrieve the inventory data 130.

At 702, the managed service 104 may run, across a plurality of user accounts 114 of an organization, computing instances 116 that have the particular configuration. At 704, the managed service 104 may receive, from a management account of the organization, a request for the managed service to discover inventory data indicating the computing instances that have the particular configuration. The particular configuration may be any type of resource configuration, such as security configurations (e.g., firewall rules or security groups, permissions for accounts, etc.), availability configurations (e.g., fallback resources, availability zones, etc.), software license configurations, and/or other configurations.

At 706, the managed service 104 may create an organization storage container 124 in an organization account 112 registered to the organization. The organization storage container 124 may have initially been created to store the inventory data 130 in the organization account 112.

At 708, the managed service 104 may create a service storage container 122 in a service account 120 registered to the managed service 104. The service storage container 122 may be configured to store inventory data 130 on behalf of a particular organization, and have attached policies that restrict access to the inventory data 130, and allow management accounts of the organization to access the inventory data 130 in the service storage container 122.

At 710, the managed service 104 may configure the plurality of user accounts 114 to send respective portions of the inventory data 130 to the service storage container 122 in the service account 120. For instance, the managed service 104 may configure user accounts 114 with a data sync 128 in each user account 114 that automatically ports or sends inventory data 130 from the managed computing instances (computing resources 116) in the user account 114 to the centralized, service storage container 122. The data syncs 128 may upload the inventory data 130 to the service storage container upon detecting changes in the computing resources 116. In some instances, the data syncs 128 may periodically, and according to a configurable periodicity, sync the inventory data 130 to the service storage container 122.

At 712, the managed service 104 may store, in the organization storage container, a manifest file 126 that indicates that the inventory data 130 for the organization account 112 is stored in the service storage container 122.

At 714, the managed service 104 may receive an application programming interface (API) request (e.g., resource inventory request 508) from the management account for at least a portion of the inventory data 130. For instance, an administrator 502 may request a subset of the inventory data 130 or otherwise filter the inventory data 130.

At 716, the managed service 104 may, based at least in part on the manifest file 126, determine that the portion of the inventory data 130 requested by the API request is stored in the service storage container 122. That is, the manifest file 126 and may point the APIs to the service storage container 122.

At 718, the managed service 104 may receive, at the service storage container 122, the API request for the at least the portion of the inventory data 130. At 720, the managed service 104 may provide the management account with access to the at least the portion of the inventory data, such as through a console 108 or another interface.

Figure 8:
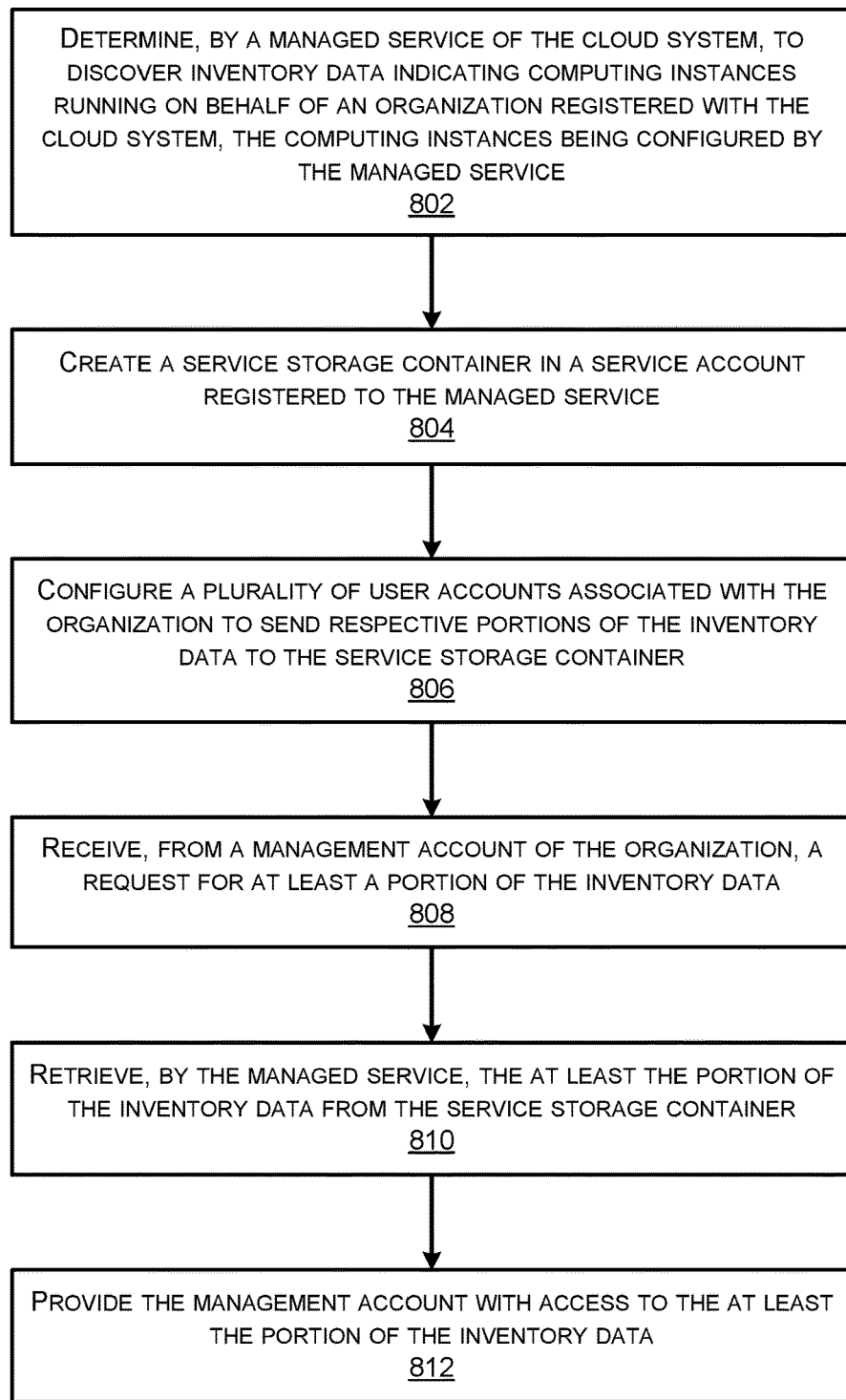
FIG. 8 illustrates a flow diagram of an example method for a managed service to collect inventory data for computing instances of an organization by configuring a plurality of user accounts of an organization to send inventory data to a storage container in a service account.

FIG. 8 illustrates a flow diagram of an example method 800 for a managed service 104 to collect inventory data 130 for computing instances 116 of an organization by configuring a plurality of user accounts 114 of an organization to send inventory data 130 to a service storage container 122 in a service account 120.

At 802, the managed service 104 may determine to discover inventory data 130 indicating computing instances 116 running on behalf of an organization registered with the cloud system 102. In some instances, the computing instances 116 may be configured by the managed service 104. The request may be a request to enroll 504 with the managed service 104 for the managed service 104 to manage configurations of the computing resources 116.

At 804, the managed service 104 may create a service storage container 122 in a service account 120 registered to the managed service 104. The service storage container 122 may be configured to store inventory data 130 on behalf of a particular organization, and have attached policies that restrict access to the inventory data 130, and allow management accounts of the organization to access the inventory data 130 in the service storage container 122.

At 806, the managed service 104 may configure a plurality of user accounts 114 associated with the organization to send respective portions of the inventory data 130 to the service storage container 122. For instance, the managed service 104 may configure user accounts 114 with a data sync 128 in each user account 114 that automatically ports or sends inventory data 130 from the managed computing instances (computing resources 116) in the user account 114 to the centralized, service storage container 122. The data syncs 128 may upload the inventory data 130 to the service storage container upon detecting changes in the computing resources 116. In some instances, the data syncs 128 may periodically, and according to a configurable periodicity, sync the inventory data 130 to the service storage container 122.

At 808, the managed service 104 may receive, from a management account of the organization, a request for at least a portion of the inventory data. As an example, the managed service 104 may receive an API request (e.g., resource inventory request 508) from the management account for at least a portion of the inventory data 130. For instance, an administrator 502 may request a subset of the inventory data 130 or otherwise filter the inventory data 130.

At 810, the managed service 104 may retrieve, by the managed service, the at least the portion of the inventory data from the service storage container. The managed service 104 may, based at least in part on a manifest file 126, determine that the portion of the inventory data 130 requested by the API request is stored in the service storage container 122. That is, the manifest file 126 and may point the APIs to the service storage container 122.

At 812, the managed service 104 may provide the management account with access to the at least the portion of the inventory data, such as through a console 108 or another interface.

Figure 9B:
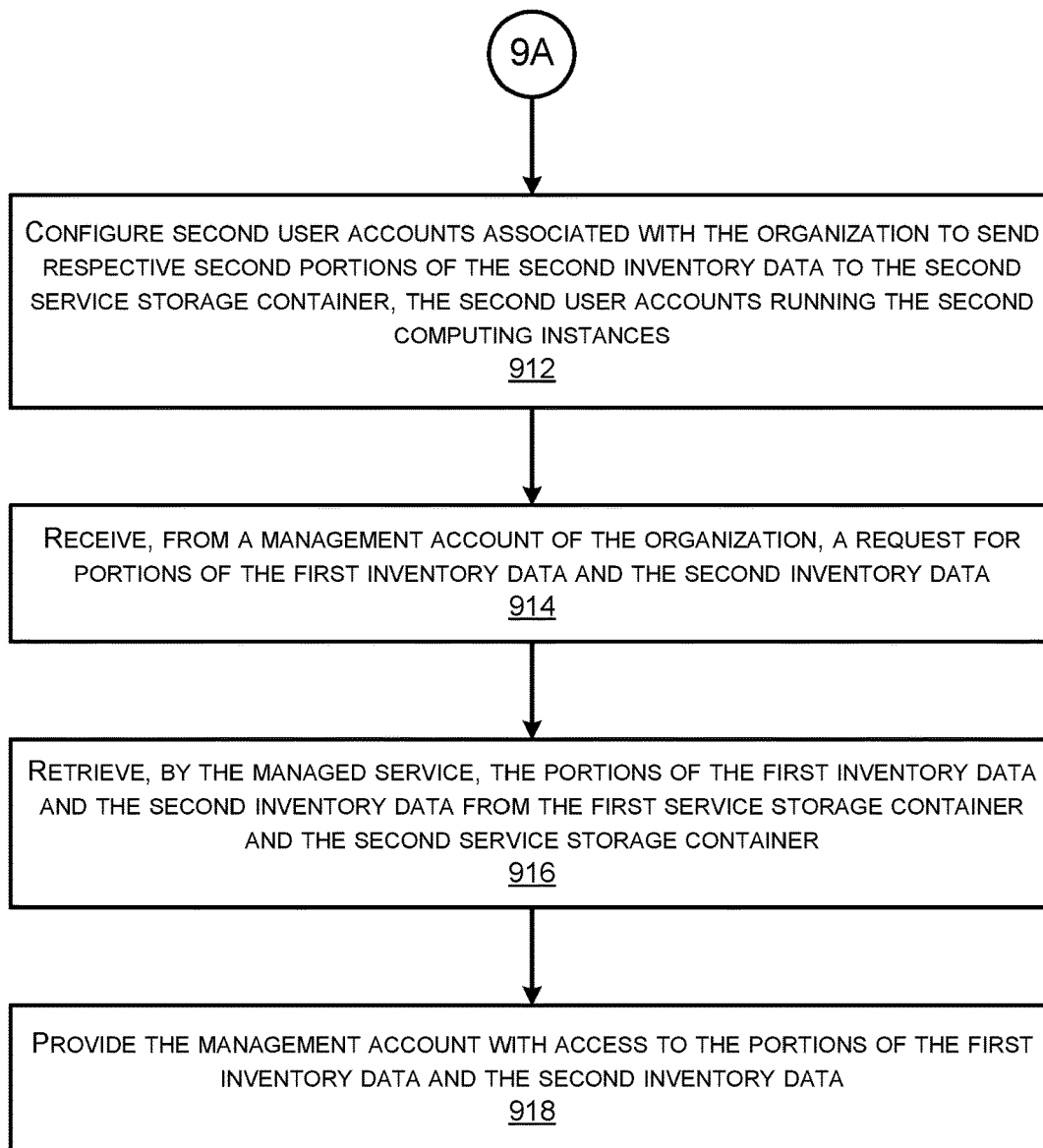

FIGS. 9A and 9B collectively illustrate a flow diagram of an example method 900 for a managed service 104 to collect inventory data 130 for computing instances 116 of an organization across different geographic regions.

At 902, the managed service 104 may determine to obtain first inventory data 130 indicating first computing instances 116 running on behalf of an organization registered with the cloud system 102. In some examples, the first computing instances 116 are configured by the managed service 104 and running in a first geographic region of the cloud system 102.

At 904, the managed service 104 may create a first service storage container 122 in a first service account 120 registered to the managed service 104. In some examples, the first service account 120 is in or associated with the first geographic region.

At 906, the managed service 104 may configure first user accounts 114 associated with the organization to send respective first portions of the first inventory data 130 to the first service storage container 122. Generally, the first user accounts 114 are running the first computing instances 116 in their respective accounts 114, and in the first geographic region.

At 908, the managed service 104 may determine to obtain second inventory data 130 indicating second computing instances 116 running on behalf of the organization. Generally, the second computing instances 116 are configured by the managed service 104 and running in a second geographic region.

At 910, the managed service 104 may create a second service storage container 122 in a second service account 120 registered to the managed service 104. The second service account 120 may be in or associated with the second geographic region.

At 912, the managed service 104 may configure second user accounts 114 associated with the organization to send respective second portions of the second inventory data 130 to the second service storage container 122. The second user accounts 114 may run the second computing instances 116.

At 914, the managed service 104 may receive, from a management account of the organization, a request for portions of the first inventory data 130 and the second inventory data 130. For instance, the management account may desire to see inventory data 130 across regions in which the managed service 104 is managing configurations of the computing instances 116.

At 916, the managed service 104 may retrieve the portions of the first inventory data 130 and the second inventory data 130 from the first service storage container 122 and the second service storage container 122.

At 918, the managed service 104 may provide the management account with access to the portions of the first inventory data 130 and the second inventory data 130, such as through a console 108 or another interface.

Figure 10:
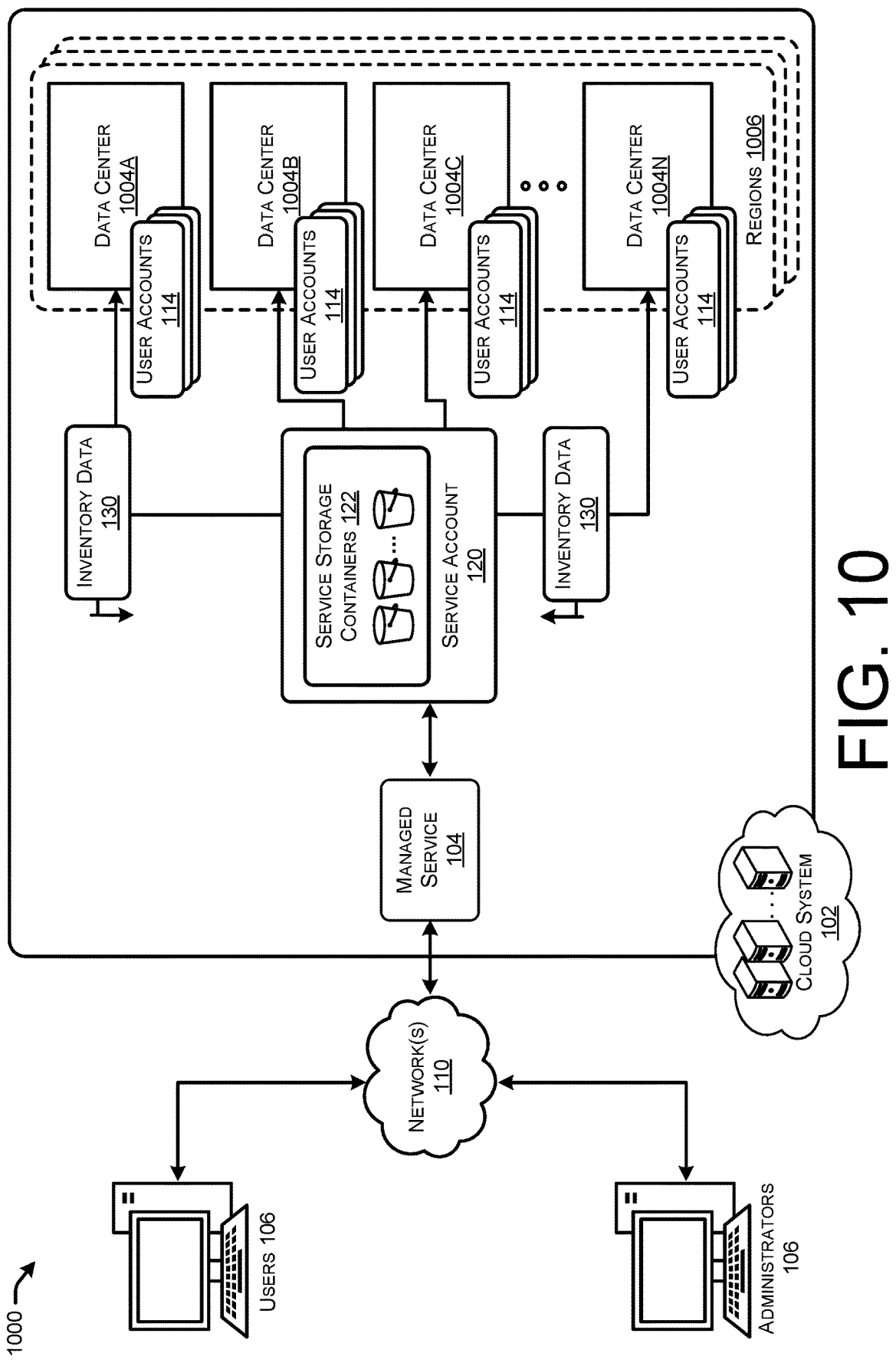
FIG. 10 is a system and network diagram that shows an illustrative operating environment that includes data centers of a cloud system that can be configured to implement aspects of the functionality described herein.

FIG. 10 is a system and network diagram 1000 that shows an illustrative operating environment that includes data centers 1004 in one or more regions 1006 of a cloud system 102 that can be configured to implement aspects of the functionality described herein. The cloud system 102 can provide computing resources, like VM instances and storage, on a permanent or an as-needed basis. Among other types of functionality, the computing resources provided by the cloud system 102 may be utilized to implement the various services described above. As also discussed above, the computing resources provided by the cloud system 102 can include various types of computing resources, such as data processing resources like VM instances, data storage resources, networking resources, data communication resources, network services, and the like.

Each type of computing resource provided by the cloud system 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The cloud system 102 can also be configured to provide other types of computing resources not mentioned specifically herein.

The computing resources provided by the cloud system 102 may be enabled in one embodiment by one or more data centers 1004A-1004N (which might be referred to herein singularly as "a data center 1004" or in the plural as "the data centers 1004"). The data centers 1004 are facilities utilized to house and operate computer systems and associated components. The data centers 1004 typically include redundant and backup power, communications, cooling, and security systems. The data centers 1004 can also be located in geographically disparate locations, or regions 1006. One illustrative embodiment for a data center 1004 that can be utilized to implement the technologies disclosed herein will be described below with regard to FIG. 11.

The users 106, such as administrators, of the user devices that utilize the cloud system 102 may access the computing resources provided by the cloud system 102 over any wired and/or wireless network(s) 110, which can be a wide area communication network ("WAN"), such as the Internet, an intranet or an Internet service provider ("ISP") network or a combination of such networks. For example, and without limitation, a user device operated by a user 106 of the cloud system 102 may be utilized to access the cloud system 102 by way of the network(s) 110. It should be appreciated that a local-area network ("LAN"), the Internet, or any other networking topology known in the art that connects the data centers 1004 to remote clients and other users can be utilized. It should also be appreciated that combinations of such networks can also be utilized.

Figure 11:
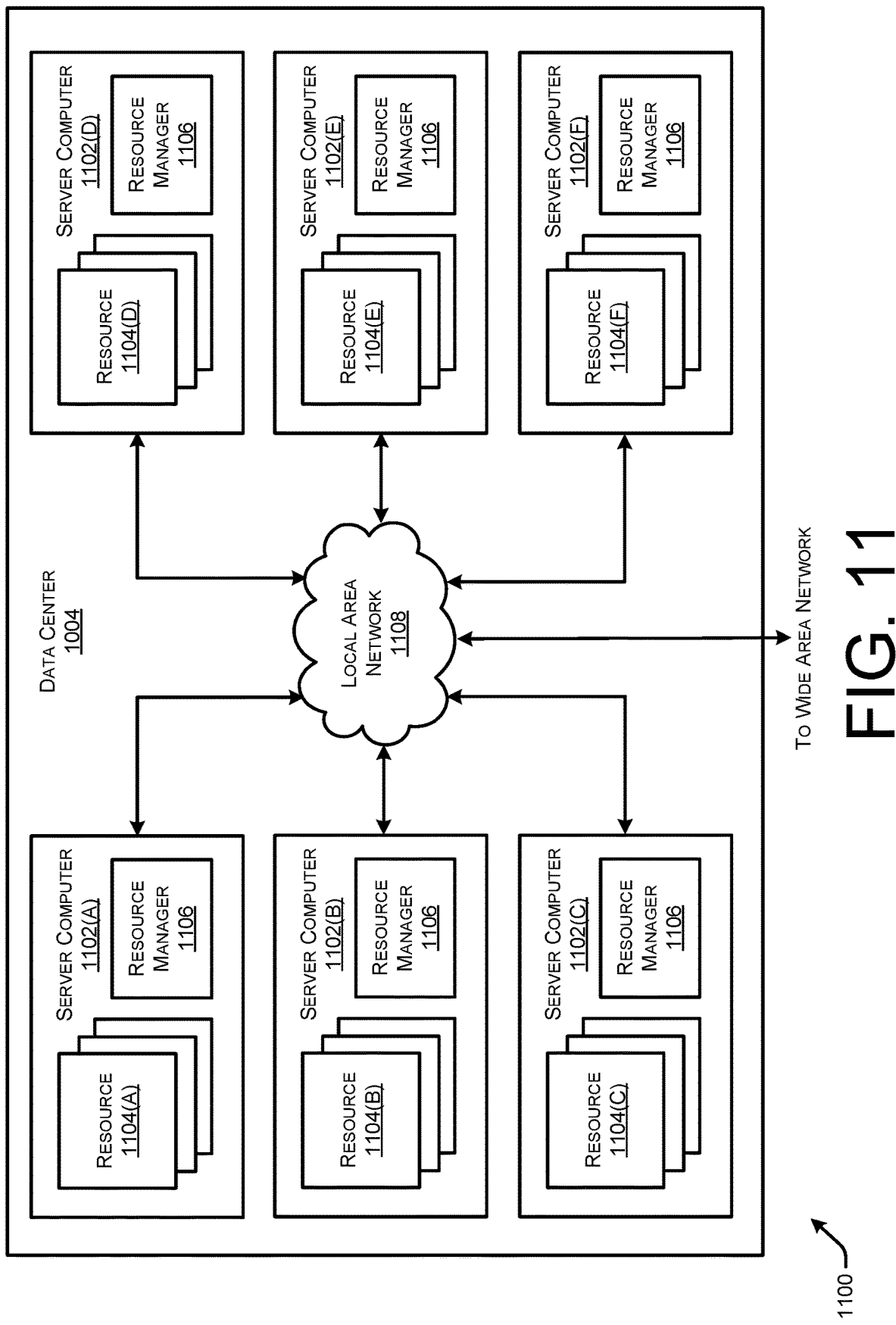
FIG. 11 is a computing system diagram illustrating a configuration for a data center that can be utilized to implement aspects of the technologies disclosed herein.

FIG. 11 is a computing system diagram 1100 that illustrates one configuration for a data center 1004 that implements aspects of the technologies disclosed herein. The example data center 1004 shown in FIG. 11 includes several server computers 1102A-1102F (which might be referred to herein singularly as "a server computer 1102" or in the plural as "the server computers 1102") for providing computing resources 1104A-1104E. In some examples, the resources 1104 and/or server computers 1102 may include, be included in, or correspond to, the computing devices described herein.

The server computers 1102 can be standard tower, rack-mount, or blade server computers configured appropriately for providing the computing resources described herein (illustrated in FIG. 11 as the computing resources 1104A-1104E). As mentioned above, the computing resources provided by the cloud system 102 can be data processing resources such as VM instances or hardware computing systems, database clusters, computing clusters, storage clusters, data storage resources, database resources, networking resources, and others. Some of the servers 1102 can also be configured to execute a resource manager 1106 capable of instantiating and/or managing the computing resources. In the case of VM instances, for example, the resource manager 1106 can be a hypervisor or another type of program configured to enable the execution of multiple VM instances on a single server computer 1102. Server computers 1102 in the data center 1004 can also be configured to provide network services and other types of services.

In the example data center 1004 shown in FIG. 11, an appropriate LAN 1108 is also utilized to interconnect the server computers 1102A-1102F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1104A-1104N, between each of the server computers 1102A-1102F in each data center 1004, and, potentially, between computing resources in each of the server computers 1102. It should be appreciated that the configuration of the data center 1004 described with reference to FIG. 11 is merely illustrative and that other implementations can be utilized.

Figure 12:
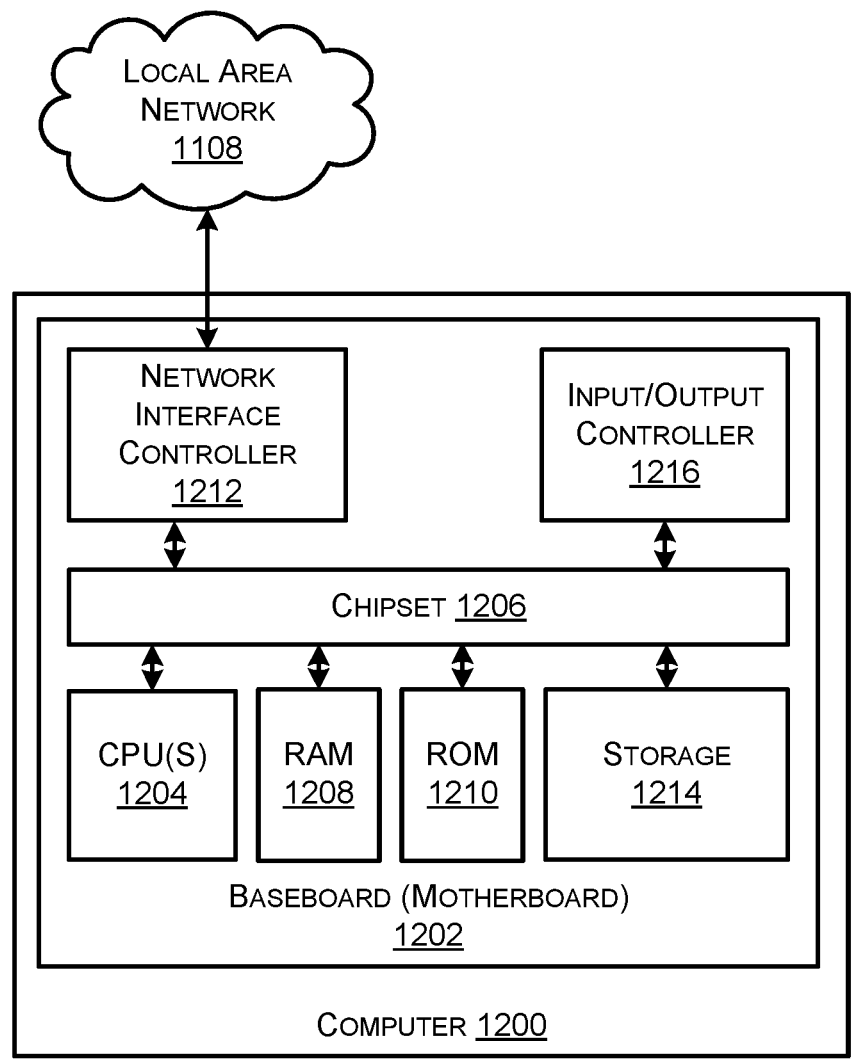
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1108. The chipset 1206 can include functionality for providing network connectivity through a network interface controller (NIC) 1212, such as a gigabit Ethernet adapter. The NIC 1212 is capable of connecting the computer 1200 to other computing devices over the network 1108 (or 110). It should be appreciated that multiple NICs 1212 can be present in the computer 1200, connecting the computer to other types of networks and remote computer systems.

The computer 1200 can include storage 1214 (e.g., disk) that provides non-volatile storage for the computer. The storage 1214 can consist of one or more physical storage units. The storage 1214 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the storage 1214 by detecting the physical states or characteristics of one or more particular locations within the physical storage units.

In addition to the storage 1214 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200. In some examples, the operations performed by the cloud system 102, and or any components included therein, may be supported by one or more devices similar to computer 1200. Stated otherwise, some or all of the operations performed by the cloud system 102, and or any components included therein, may be performed by one or more computer devices 1200 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1214 can store an operating system utilized to control the operation of the computer 1200. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 1214 can store other system or application programs and data utilized by the computer 1200.

In one embodiment, the storage 1214, RAM 1208, ROM 1210, and/or other computer-readable storage media may be encoded with computer-executable instructions which, when loaded into the computer 1200, transform the computer from a general-purpose computing system into a special-purpose computer capable of implementing the embodiments described herein. These computer-executable instructions transform the computer 1200 by specifying how the CPUs 1204 transition between states, as described above. According to one embodiment, the computer 1200 has access to computer-readable storage media storing computer-executable instructions which, when executed by the computer 1200, perform the various techniques described above. The computer 1200 can also include computer-readable storage media having instructions stored thereupon for performing any of the other computer-implemented operations described herein.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or might utilize an architecture completely different than that shown in FIG. 12.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method performed by a cloud system having a managed service that discovers inventory data for computing instances with a particular configuration, the method comprising:

running, across a plurality of user accounts of an organization, computing instances that have the particular configuration;

receiving, from a management account of the organization, a request for the managed service to discover inventory data indicating the computing instances that have the particular configuration;

creating an organization storage container in an organization account registered to the organization;

creating a service storage container in a service account registered to the managed service;

configuring the plurality of user accounts to send respective portions of the inventory data to the service storage container in the service account;

storing, in the organization storage container, a manifest file that indicates that the inventory data for the organization account is stored in the service storage container;

receiving, at the managed service, an application programming interface (API) request from the management account for at least a portion of the inventory data;

based at least in part on the manifest file, determining that the portion of the inventory data requested by the API request is stored in the service storage container;

receiving, at the service storage container, the API request for the at least the portion of the inventory data; and providing the management account with access to the at least the portion of the inventory data.

2. The method of claim 1, further comprising:

attaching an access policy to the service storage container indicating that:

the service storage container is associated with the organization account;

the management account is allowed to access the service storage container; and user accounts other than the management account are restricted from accessing the service storage container; and determining, using the access policy, to respond to the API request sent by the management account.

3. The method of claim 1, further comprising:

storing, in the service account, a plurality of service storage containers on behalf of a plurality of organization accounts registered with the cloud system;

determining that a number of the plurality of service storage containers is associated with a maximum number of storage containers that are permitted to be created in the service account; and creating a second service account associated with the managed service in which to create subsequent storage containers on behalf of additional organization accounts.

4. The method of claim 1, further comprising:

creating a set of permissions in the organization account that are usable by the managed service to perform management operations in the organization account, wherein the configuring the plurality of user accounts to send the respective portions of the inventory data to the service storage container is performed by the managed service and using the set of permissions.

5. A cloud system comprising:

one or more processors; and one or more computer-readable media storing computer-executable instructions that, when executed by the one or more processors, cause the cloud system to perform operations comprising:

determining, by a managed service of the cloud system, to discover inventory data indicating computing instances running on behalf of an organization registered with the cloud system, the computing instances being configured by the managed service;

creating a service storage container in a service account registered to the managed service;

configuring a plurality of user accounts associated with the organization to send respective portions of the inventory data to the service storage container;

receiving, from a management account of the organization, a request for at least a portion of the inventory data;

retrieving, by the managed service, the at least the portion of the inventory data from the service storage container; and providing the management account with access to the at least the portion of the inventory data.

6. The cloud system of claim 5, the operations further comprising:

creating an organization storage container in an organization account of the organization;

storing, in the organization storage container, a manifest file that indicates that the inventory data for the organization is stored in the service storage container;

wherein the receiving the request for the at least the portion of the inventory data comprises:

receiving, at the organization storage container, an application programming interface (API) request from the management account for the at least a portion of the inventory data; and based at least in part on the manifest file, redirecting the API request to the service storage container.

7. The cloud system of claim 6, the operations further comprising:

attaching an access policy to the service storage container indicating that:

the service storage container is associated with the organization account; and the management account is allowed to access the inventory data stored in the service storage container; and determining, using the access policy, to respond to the API request sent by the management account.

8. The cloud system of claim 5, the operations further comprising:

creating a set of permissions in an organization account associated with the organization that are usable by the managed service to perform management operations in the organization account, wherein the configuring the plurality of user accounts to send the respective portions of the inventory data to the service storage container is performed by the managed service and using the set of permissions.

9. The cloud system of claim 5, wherein configuring the plurality of user accounts to send the respective portions of the inventory data to the service storage container comprises;

deploying a data-sync resource in each of the plurality of user accounts, wherein each data-sync resource is configured to send, to the service storage container, the respective portions of the inventory data for respective computing instances in respective ones of the plurality of user accounts.

10. The cloud system of claim 5, wherein the service storage container and the service account are associated with a first geographic region of the cloud system, the operations further comprising:

determining that the plurality of user accounts run second computing instances in a second geographic region of the cloud system;

creating, in the second geographic region, a second service storage container in a second service account registered to the managed service; and configuring the plurality of user accounts to send respective second portions of second inventory data to the second service storage container.

11. The cloud system of claim 5, the operations further comprising:

storing, in the service account, a plurality of service storage containers on behalf of a plurality of organization accounts registered with the cloud system;

determining that a number of the plurality of service storage containers is associated with a maximum number of storage containers that are permitted to be created in the service account; and creating a second service account associated with the managed service in which to create subsequent storage containers on behalf of additional organization accounts.

12. The cloud system of claim 11, the operations further comprising:

receiving, at a routing layer associated with the managed service, a second request for second inventory data stored in a second service storage container;

determining, based on a globally-unique identifier associated with the second service storage container, that the second service storage container is located in the second service account; and routing, by the routing layer, the second request to the second service account in which the second service storage container is located.

13. A method comprising:

determining, by managed service of a cloud system, to obtain first inventory data indicating first computing instances running on behalf of an organization registered with the cloud system, the first computing instances being configured by the managed service and running in a first geographic region;

creating a first service storage container in a first service account registered to the managed service, the first service account being in the first geographic region;

configuring first user accounts associated with the organization to send respective first portions of the first inventory data to the first service storage container, the first user accounts running the first computing instances;

determining, by the managed service, to obtain second inventory data indicating second computing instances running on behalf of the organization, the second computing instances being configured by the managed service and running in a second geographic region;

creating a second service storage container in a second service account registered to the managed service, the second service account being in the second geographic region;

configuring second user accounts associated with the organization to send respective second portions of the second inventory data to the second service storage container, the second user accounts running the second computing instances;

receiving, from a management account of the organization, a request for portions of the first inventory data and the second inventory data;

retrieving, by the managed service, the portions of the first inventory data and the second inventory data from the first service storage container and the second service storage container; and providing the management account with access to the portions of the first inventory data and the second inventory data.

14. The method of claim 13, further comprising:

attaching an access policy to the first service storage container and the second service storage container indicating that:

the first and second service storage containers are associated with the management account; and the management account is allowed to access the first and second inventory data stored in the first and second service storage containers; and determining, using the access policy, to respond to the request sent by the management account.

15. The method of claim 13, further comprising:

creating an organization storage container in an organization account of the organization that is in the first geographic region;

storing, in the organization storage container, a manifest file that indicates that the first inventory data for the organization is stored in the first service storage container;

wherein the receiving the request for portions of the first inventory data and the second inventory data comprises:

receiving, at the organization storage container, an application programming interface (API) request from the management account for a first portion of the first inventory data; and based at least in part on the manifest file, redirecting the API request to the first service storage container.

16. The method of claim 13, further comprising:

creating a set of permissions in an organization account associated with the organization that are usable by the managed service to perform management operations in the organization account, wherein the configuring the first user accounts to send the first portions of the first inventory data to the first service storage container is performed by the managed service and using the set of permissions.

17. The method of claim 13, wherein configuring the first user accounts to send the respective first portions of the first inventory data to the first service storage container comprises;

deploying a data-sync resource in each of the first user accounts, wherein each data-sync resource is configured to send, to the first service storage container, the respective first portions of the first inventory data for respective first computing instances in respective ones of the first user accounts.

18. The method of claim 13, further comprising:

the first geographic region is included in the cloud system; and the second geographic region is included in an on-premises network associated with the organization.

19. The method of claim 13, further comprising:

storing, in the first service account, a plurality of service storage containers on behalf of a plurality of organization accounts registered with the cloud system;

determining that a number of the plurality of service storage containers is associated with a maximum number of storage containers that are permitted to be created in the first service account; and creating a third service account in the first geographic region and associated with the managed service in which to create subsequent storage containers on behalf of additional organization accounts.

20. The method of claim 19, further comprising:

receiving, at a routing layer associated with the managed service, a second request for third inventory data stored in a third service storage container;

determining, based on a globally-unique identifier associated with the third service storage container, that the third service storage container is located in the third service account; and routing, by the routing layer, the second request to the third service account in which the third service storage container is located.

* * * * *